(12) United States Patent
Hayama

(10) Patent No.: US 6,760,125 B1
(45) Date of Patent: Jul. 6, 2004

(54) IMAGE PROCESSING METHOD AND DEVICE

(75) Inventor: Hitoshi Hayama, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/545,167

(22) Filed: Apr. 6, 2000

(30) Foreign Application Priority Data

Apr. 6, 1999 (JP) .......................................... 11-098830
May 18, 1999 (JP) .......................................... 11-137742

(51) Int. Cl.[7] ........................ H04N 1/387; H04N 1/407; H04N 1/50; G06K 15/02
(52) U.S. Cl. ...................... 358/1.9; 358/3.01; 358/1.18; 358/530; 358/450
(58) Field of Search ..................... 358/1.9, 2.1, 3.01, 358/1.18, 500, 527, 530, 538, 540, 450, 501, 1.16, 524, 444; 345/589, 690, 694; 400/120.02

(56) References Cited

U.S. PATENT DOCUMENTS

| | | | | |
|---|---|---|---|---|
| 5,059,963 A | * | 10/1991 | Fukuoka | .................... 345/694 |
| 5,361,143 A | * | 11/1994 | Nakayama et al. | ......... 358/500 |
| 5,400,053 A | * | 3/1995 | Johary et al. | ............... 345/690 |
| 5,890,820 A | * | 4/1999 | Handa | ................... 400/120.02 |

* cited by examiner

*Primary Examiner*—Scott Rogers
(74) *Attorney, Agent, or Firm*—Hogan & Harston, LLP

(57) ABSTRACT

A printer block is capable of outputting synthesized images such that the synthesized images are recognizable, each of the synthesized images being synthesized from image elements. A display is capable of outputting any of the image elements such that the any of the image elements is recognizable only when the display outputs the any of the image elements separately. The image elements of each of the synthesized images are stored, in a non-synthesized state, with a predetermined one of the image elements being set to a representative image element that symbolizes a corresponding one of the synthesized images. The display is caused to output, in place of any one of the synthesized images, the representative image corresponding to the any one of the synthesized images.

52 Claims, 26 Drawing Sheets

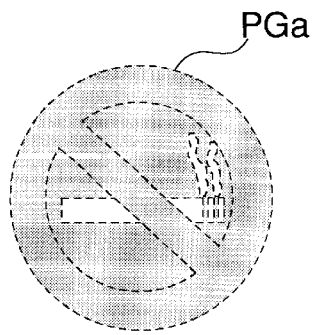
F I G. 6 A
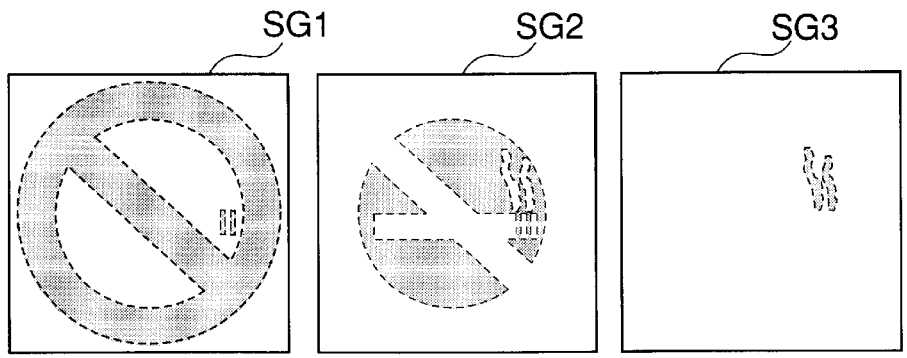
F I G. 6 B
F I G. 6 C

FIG. 7

| No. | TITLE OF COLOR | C | M | Y | K | C2 | M2 | Y2 |
|---|---|---|---|---|---|---|---|---|
| 1 | K(BLACK) | 4 | 4 | 4 | 4 | 0 | 0 | 0 |
| 2 | WHITE | 0 | 0 | 0 | 0 | 0 | 0 | 0 |
| 3 | DARK GRAY | 3 | 3 | 3 | 3 | 0 | 0 | 0 |
| 4 | GRAY | 2 | 2 | 2 | 2 | 0 | 0 | 0 |
| 5 | LIGHT GRAY | 1 | 1 | 1 | 1 | 0 | 0 | 0 |
| 6 | RED | 0 | 4 | 4 | 0 | 0 | 4 | 4 |
| 7 | BLUE | 4 | 4 | 0 | 0 | 4 | 4 | 0 |
| 8 | GREEN | 4 | 0 | 4 | 0 | 4 | 0 | 4 |
| 9 | CYAN | 4 | 0 | 0 | 0 | 4 | 0 | 0 |
| 10 | MAGENTA | 0 | 4 | 0 | 0 | 0 | 4 | 0 |
| 11 | YELLOW | 0 | 0 | 4 | 0 | 0 | 0 | 4 |
| 12 | LIGHT RED | 0 | 2 | 2 | 0 | 0 | 2 | 2 |
| 13 | LIGHT BLUE | 2 | 2 | 0 | 0 | 2 | 2 | 0 |
| 14 | LIGHT GREEN | 2 | 0 | 2 | 0 | 2 | 0 | 2 |
| 15 | LIGHT CYAN | 2 | 0 | 0 | 0 | 2 | 0 | 0 |
| 16 | LIGHT MAGENTA | 0 | 2 | 0 | 0 | 0 | 2 | 0 |
| 17 | LIGHT YELLOW | 0 | 0 | 2 | 0 | 0 | 0 | 2 |
| 18 | AMARANTH | 0 | 4 | 2 | 0 | 0 | 4 | 2 |
| 19 | LIGHT AMARANTH | 0 | 2 | 1 | 0 | 0 | 2 | 1 |
| 20 | ORANGE | 0 | 2 | 4 | 0 | 0 | 2 | 4 |
| 21 | LIGHT ORANGE | 0 | 1 | 2 | 0 | 0 | 1 | 2 |
| 22 | YELLOWISH GREEN | 4 | 0 | 2 | 0 | 4 | 0 | 2 |
| 23 | LIGHT YELLOWISH GREEN | 2 | 0 | 1 | 0 | 2 | 0 | 1 |

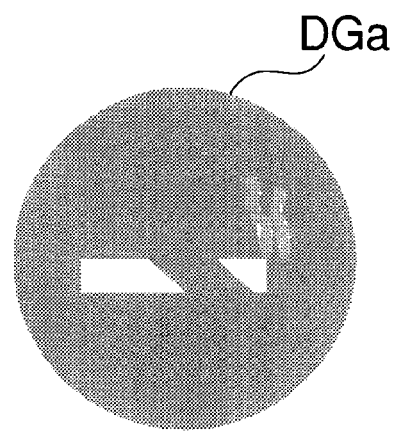
F I G. 8 A
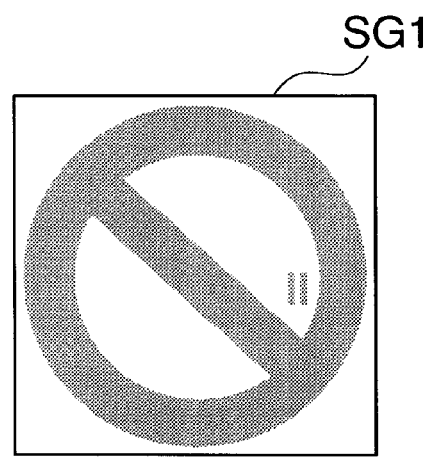
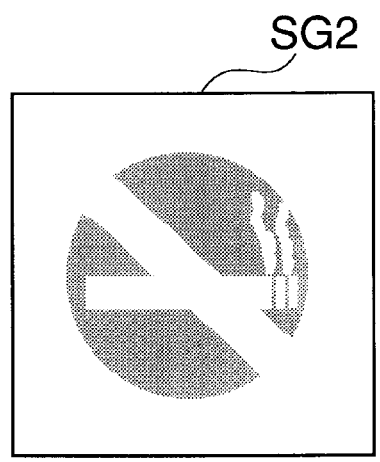
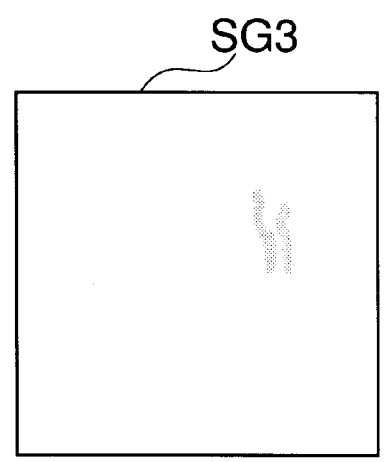
F I G. 8 B

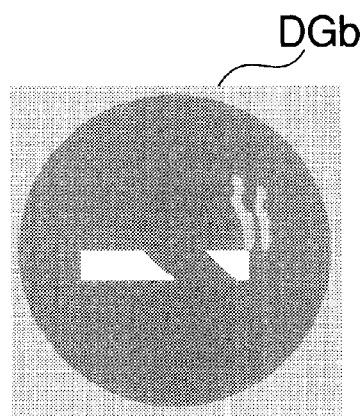
F I G. 9 A
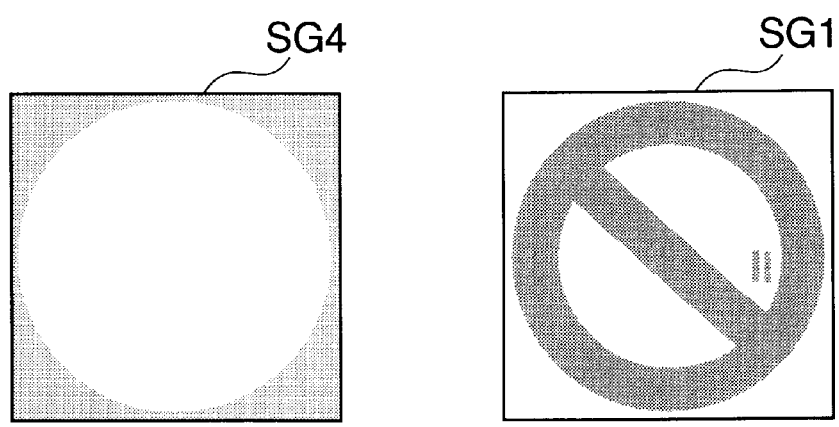
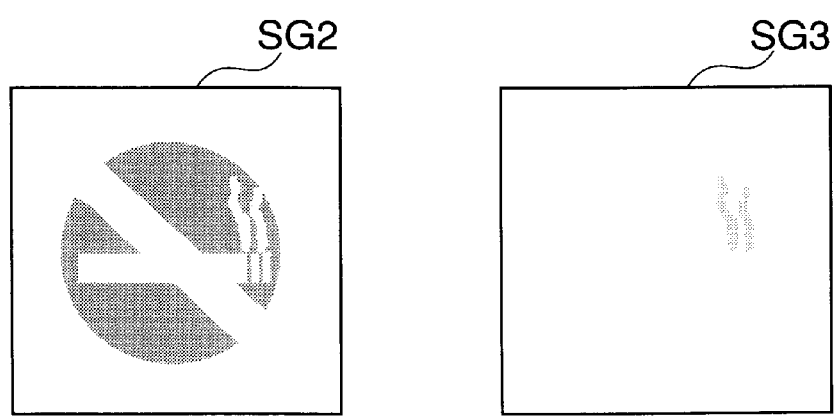
F I G. 9 B

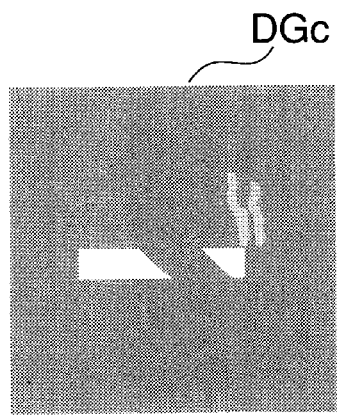
F I G. 10 A
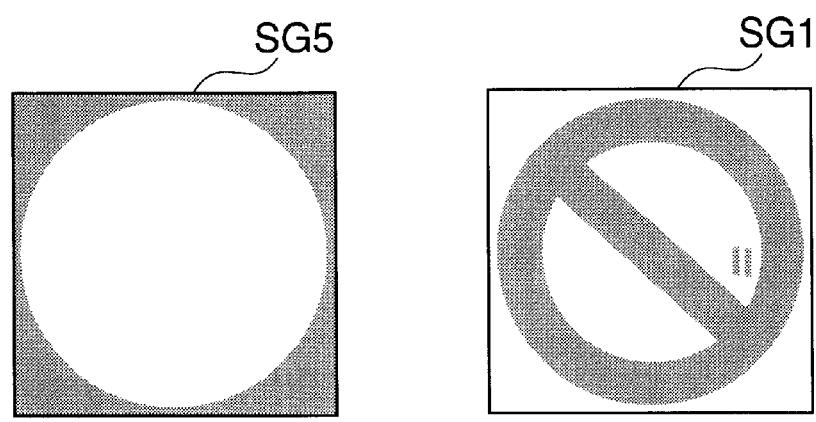
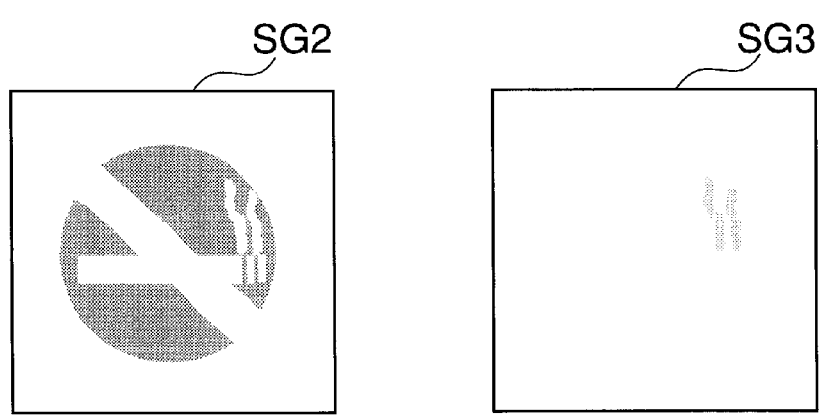
F I G. 10 B

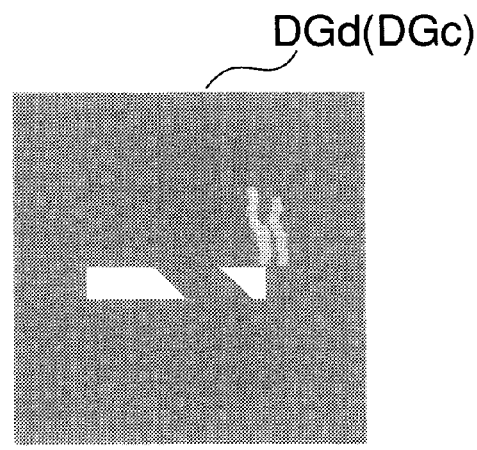
F I G. 11A
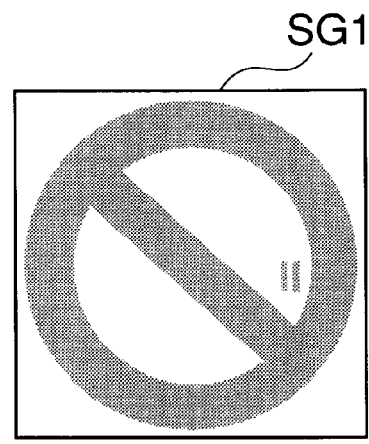
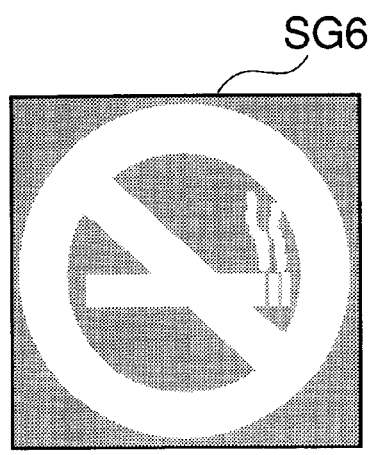
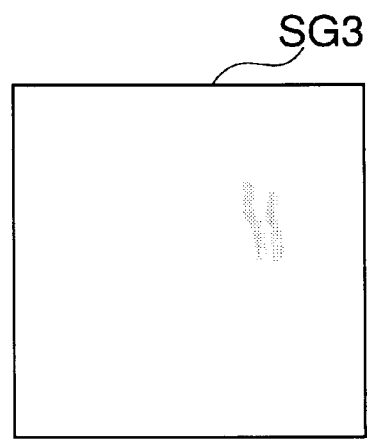
F I G. 11B

F I G. 1 2

| IMAGE No. | TITLE | PRINT IMAGE (IMAGE ELEMENTS TO BE SYNTHESIZED) | SYNTHESIZED DISPLAY IMAGE | REPRESENTATIVE DISPLAY IMAGE (IMAGE ELEMENT) | SELECTION METHOD | REFERENCE FIGURE OF STORED IMAGES |
|---|---|---|---|---|---|---|
| 1 | NO-SMOKING MARK1 | PGa(SG1+SG2+SG3) | DGa | TGa(SG2) | CHARACTERISTIC FEATURE | FIG.13 |
|  |  | PGb(SG1+SG2+SG3+SG4) | DGb | TGb(SG2) | CHARACTERISTIC FEATURE | FIG.14 |
|  |  | PGc(SG1+SG2+SG3+SG5) | DGc | TGc(SG2) | CHARACTERISTIC FEATURE | FIG.15 |
| 2 | NO-SMOKING MARK 2 | PGd(SG1+SG3+SG6) | DGd | TGd(SG6) | CHARACTERISTIC FEATURE · GENERAL VIEW | FIG.16 |
| 3 | AUTUMN MOON | PGh(SG10+SG11+SG12) | DGh | TGh(SG10) | GENERALVIEW (CHARACTERRISTIC FEATURE) | FIG.17 |
|  |  |  |  | TGi(SG12) | CHARACTERISTIC FEATURE |  |
| 4 | AUTUMN GRASS |  |  | TGj(SG11) | CHARACTERISTIC FEATURE |  |
| 5 | SNOWMAN | PGk(SG13+SG14+SG15 +SG16+SG17+SG18 +SG19) | DGk | TGk(SG13) | CHARACTERISTIC FEATURE · GENERAL VIEW | FIG.18 ⎱ FIG.19 |
|  |  |  |  | TGl(SG14) | CHARACTERISTIC FEATURE |  |

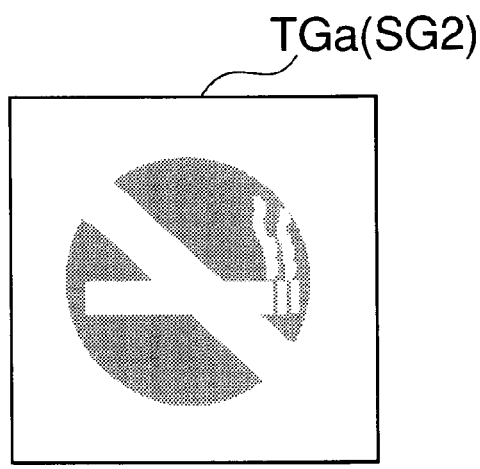
FIG. 13A
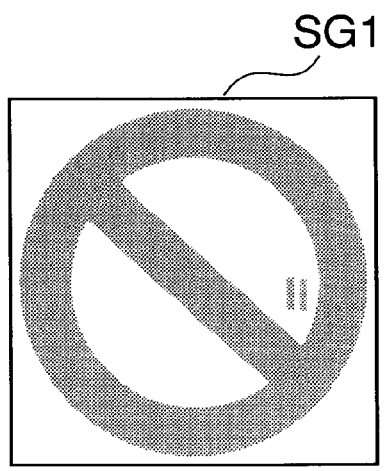 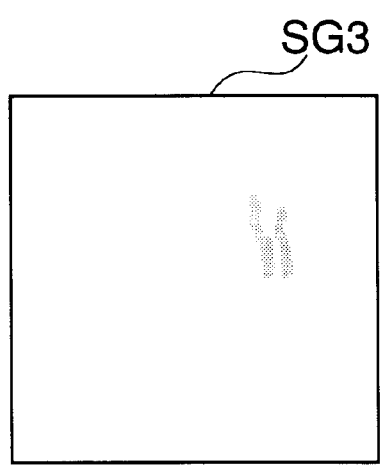
FIG. 13B

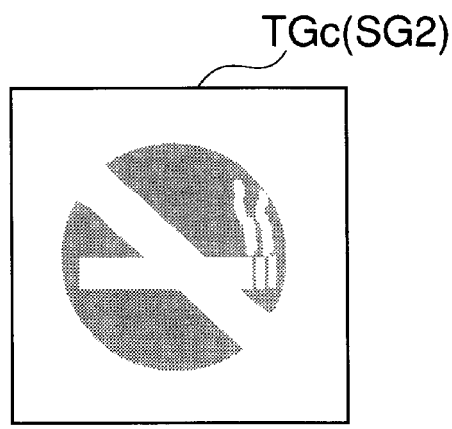
F I G. 1 5 A
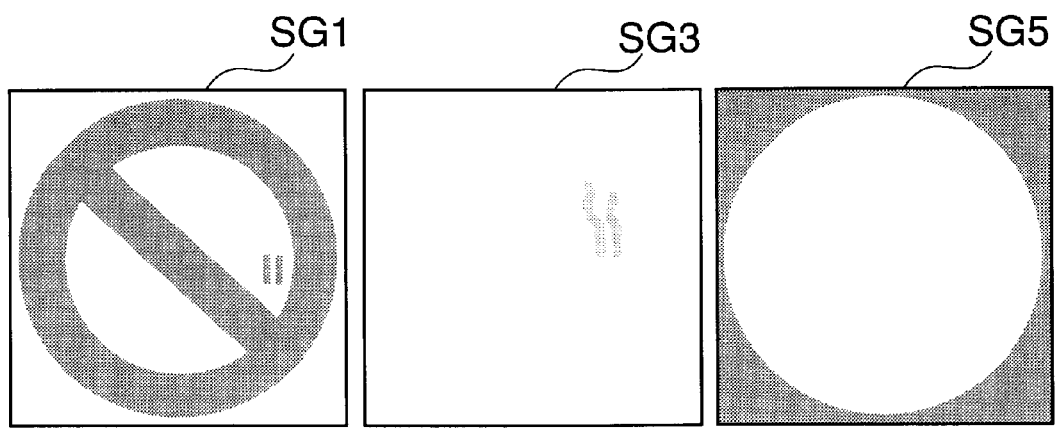
F I G. 1 5 B

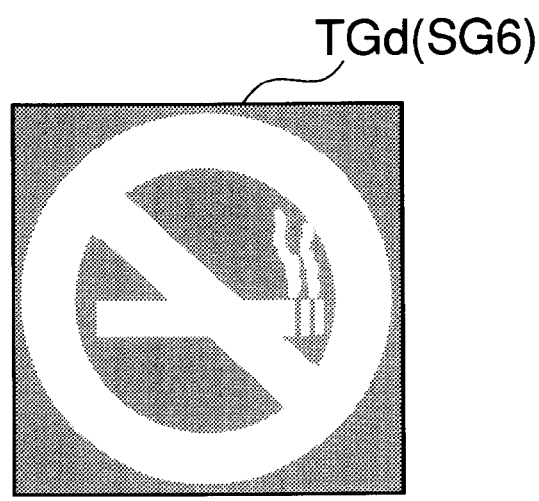
F I G. 1 6 A
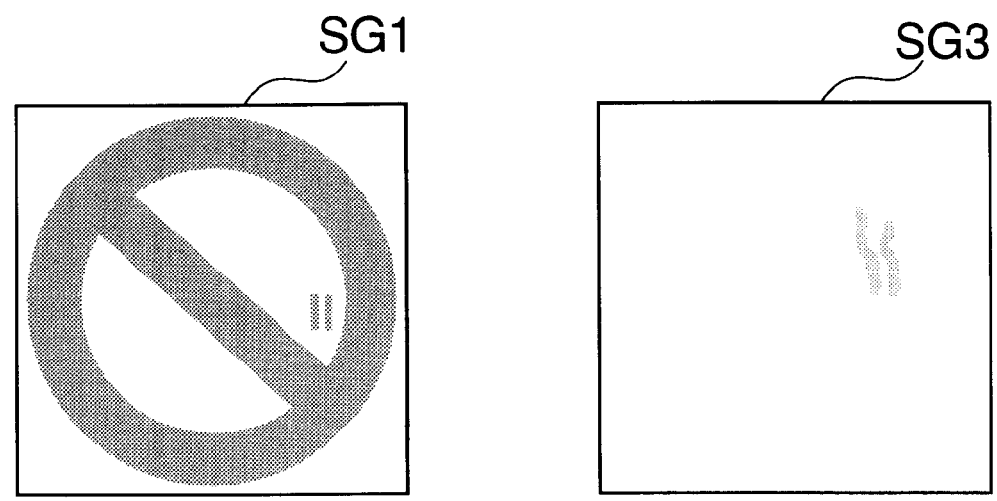
F I G. 1 6 B

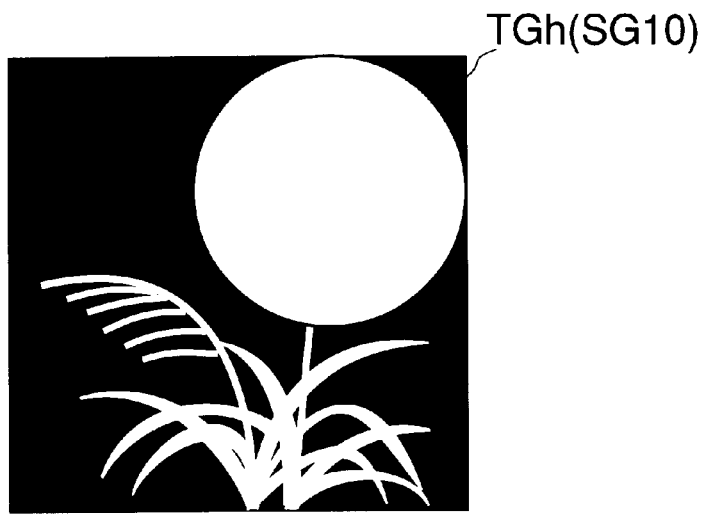
F I G. 1 7 A
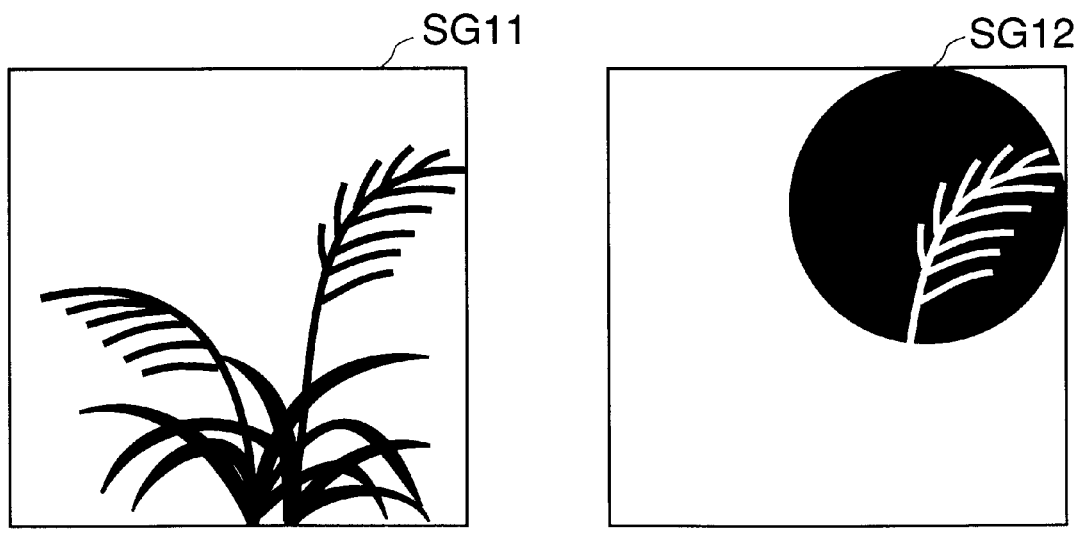
F I G. 1 7 B

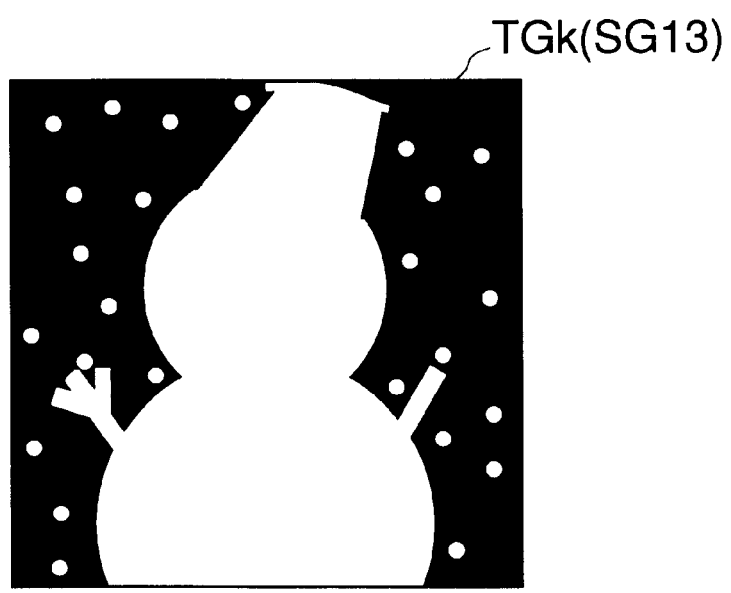
F I G. 1 8 A

FIG. 19
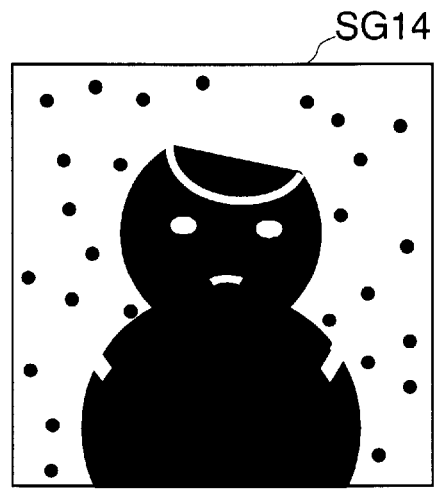
SG14
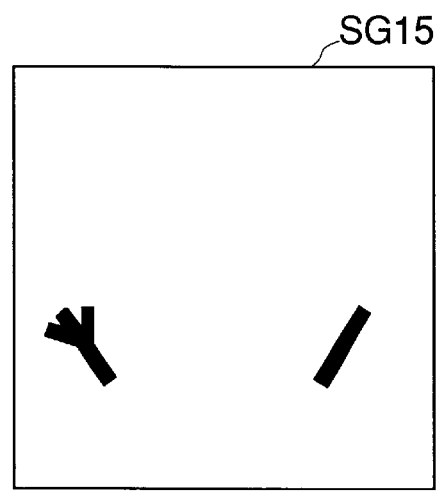
SG15
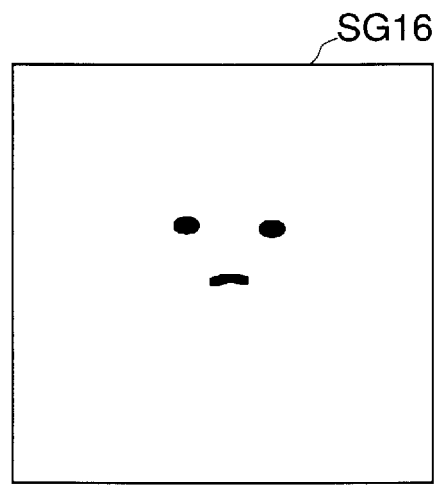
SG16
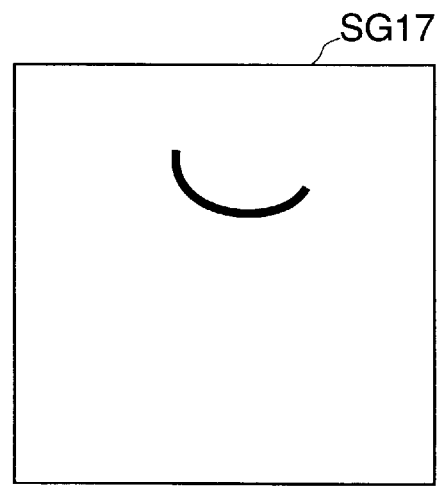
SG17
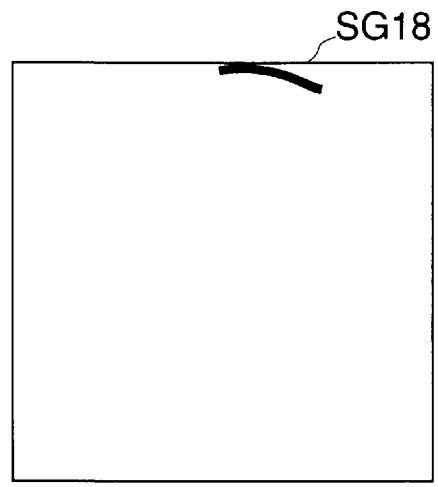
SG18
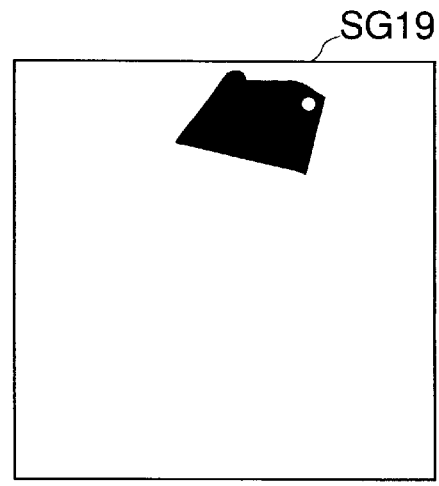
SG19

F I G. 2 0
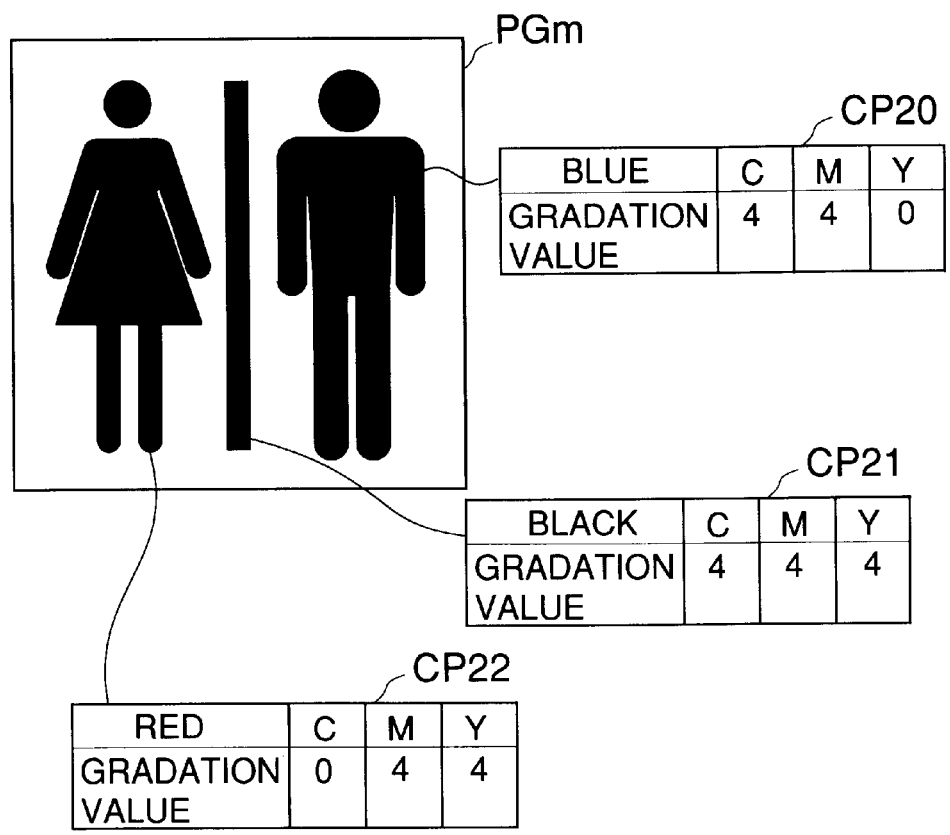

IMAGE PROCESSING METHOD AND DEVICE

BACKGROUND OF THE INVENTION

1. Field of the Invention

This invention relates to an image processing method and device for outputting an output image to be output by an output device to another output device for checking or confirmation of the output image.

2. Prior Art

In general, in an output device of this kind, such as a display device (various types of displays or the like) and a printing device (various types of printers), a gray tone of each pixel of a monochrome (e.g. black and white) image is represented by a gradation value of the pixel. More specifically, a gray tone of each pixel is represented as a gradation value, based on image data (monochrome image data) representative of the monochrome image, and the pixel is output (displayed or printed) in a density corresponding to the gradation value, whereby the monochrome image is output.

On the other hand, the color of each pixel of a color image is represented by gradation values of respective basic colors for use in composing various colors. For the color of each pixel of a display image, for instance, three colors R (red), G (green), and B (blue) are defined as the basic colors, while for the color of each pixel of a print image, three primary colors C (cyan), M (magenta), and Y (yellow), and a color K (black) which is a mixture of the three primary colors C, M, and Y are defined as the basic colors. The color of each pixel of the color image is decomposed into gradation values indicative of respective gradation levels of the basic colors, based on image data (color image data) representative of the color image, and then, each pixel is output in a density corresponding to the gradation value on a basic color-by-basic color basis. As a result, the colors of the pixels of the color image are expressed by a so-called additive or subtractive color mixing process, and the color image formed of the colors is output.

A user sometimes wants to check e.g. an image (data) prepared for being output by an output device other than his own output device, by outputting the image by using his own output device. In such a case, if the output device other than his is of a type devised exclusively for handling monochrome images, and his own output device is of a type which is capable of handling color images, i.e. if the user wants to check a monochrome image data prepared for being output by the former device, by using the latter, there occurs no problem, because the latter can handle the monochrome image by decomposing its color into gradation values of the basic colors. However, if the user wants to check a color image represented by color image data, by using a device which can only handle monochrome images, it is required to represent each color of the color image only by a gradation value indicative of a gray tone of a monochrome unicolor corresponding to the color of the color image. More specifically, each color of the color image, which is decomposed into gradation values indicative of respective gradation levels of the basic colors for representation by the basic colors, is required to be represented only by a gradation value indicative of a gray tone of a monochrome unicolor.

A similar case occurs to a single identical image processing device e.g. when a user who uses an image processing device including a printing device capable of printing color images and a display device capable of displaying only monochrome images wants to check an image prepared (as a print image) for printing, by displaying the image before the printing. Especially when a plurality of candidates for a print image are registered, and the user wants to select and print a desired one of the registered images, he would like to check, by displaying an image to be printed before execution of the printing, whether or not the image is the desired one, because if an image other than the desired image is printed, not only time and labor spent on the printing but also a printing object material used for the printing come to nothing. Further, there is a case in which a result of printing to be effected on a printing object material (i.e. a layout of a print image, etc.) is desired to be checked in advance on the display, so as to avoid the waste mentioned above. Particularly, when a plurality of print images of different kinds are to be printed simultaneously, it is required to display the print images such that they can be discriminated from each other, so as to check the layout of the print image.

In these cases, however, if a print image formed of a plurality of colors is output as a monochrome image without further processing, and if the monochromes output in representation of the plurality of colors have the same gradation level, the boundaries dividing between the image elements which are originally distinguished from each other by the colors cannot be discerned, and hence the output image itself cannot be identified. Although the problem described in the above examples occurs when a color image is output as a monochrome image, the user suffers from the same problem when a monochrome image having multiple gradation values is output as a monochrome image having a smaller number or limited range of gradation values. More specifically, if a monochrome image having multiple gradation values is output in a manner adapted to the smaller number or limited range of gradation values without further processing, one or more boundaries dividing between a plurality of image elements which are originally distinguished by gray tones thereof can become unable to be discerned, which makes it impossible to identify the output image.

SUMMARY OF THE INVENTION

It is a first object of the invention to provide an image processing method and device which makes it possible to easily confirm that an image to be output by a first image-outputting device capable of outputting synthesized images each synthesized from a plurality of image elements such that the synthesized images are recognizable, by using a second image-outputting device capable of outputting the image elements such that they are recognizable only when each of them is output separately.

It is a second object of the invention to provide an image-forming method which makes it possible to easily check on whether a synthesized image to be output by a first image-outputting device capable of outputting synthesized images each synthesized from a plurality of image elements such that the synthesized images are recognizable is a desired image, by using a second image-outputting device capable of outputting the image elements such that they are recognizable only when each of them is output separately, without accompanying extra processing time or an increase in the capacity of memory only for checking on the synthesized image.

To attain the first object, according to a first aspect of the invention, there is provided a method of processing an image to be processed by an image processing device having a first image-outputting device that is capable of outputting synthesized images such that the synthesized images are recognizable, each of the synthesized images being synthesized from image elements, and a second image-outputting device that is capable of outputting any of the image elements such that the any of the image elements is recognizable only when the second image-outputting device outputs the any of the image elements separately.

The method according to the first aspect of the invention is characterized by comprising the steps of:

storing the image elements of the each of the synthesized images, in a non-synthesized state, with a predetermined one of the image elements being set to a representative image element that symbolizes a corresponding one of the synthesized images; and causing the second image-outputting device to output, in place of any one of the synthesized images, the representative image corresponding to the any one of the synthesized images.

To attain the above object, according to a second aspect of the invention, there is provided an image processing device, comprising:

a first image-outputting device that is capable of outputting synthesized images such that the synthesized images are recognizable, each of the synthesized images being synthesized from image elements;

a second image-outputting device that is capable of outputting any of the image elements such that the any of the image elements is recognizable only when the second image-outputting device outputs the any of the image elements separately;

an image storage device that stores the image elements of the each of the synthesized images, in a non-synthesized state, with a predetermined one of the image elements being set to a representative image element that symbolizes a corresponding one of the synthesized images; and an image output control section that causes the second image-outputting device to output, in place of any one of the synthesized images, the representative image corresponding to the any one of the synthesized images.

In general, e.g. in the case of a color image to be output for display or printing being a unicolored one, even though the unicolor (single color) is different from any color for monochromatic output, it is possible to output the color image as a monochrome image by converting the single color to a color having a gradation value for monochromatic output, based on gradation values indicative of shading (lightness or darkness) of the respective basic colors composing the single color (e.g. by employing the maximum value or average value of the gradation values of the basic colors). Therefore, even in the case of an output image having a plurality of colors, if the image is regarded as a synthesized image formed by synthesizing unicolor image elements, and the unicolor image elements are output separately on an element-by-element basis, it is possible to output the image elements as monochrome images such that they are recognizable. Further, a monochrome image having a multiple gradation values can be regarded as an image synthesized from a plurality of image elements having respective different sets or ranges of gradation values, and by decomposing the monochrome image into image elements, and outputting each of the image elements separately according to the smaller number or limited range of gradation values, the individual output images i.e. image elements can be recognized though they are output as monochrome images having a smaller number or limited range of gradation values.

According to the image processing method and device, image elements of each of synthesized images are stored, in a non-synthesized state, with a predetermined one of the image elements being set to a representative image element that symbolizes a corresponding one of the synthesized images, and the second image-outputting device is caused to output, in place of any one of the synthesized images, the representative image corresponding to the any one of the synthesized images. That is, in place of any of the synthesized images, an image element which symbolizes the any of the synthesized images can be caused to be output by the second image-outputting device as a representative image. Therefore, even with the second image-outputting device which is only capable of outputting the image elements such that they are recognizable only when each of them is output separately, if the image output thereby is the representative image, it can be output as an recognizable image. Further, since the representative image symbolizes the synthesized image, by viewing the same, it is possible to understand that it is output in place of the synthesized image, whereby it can be checked whether an image to be output by the first image-outputting device is a desired image.

Preferably, the method includes the step of selecting one of the synthesized images, and the step of causing the second image-outputting device to output the representative image includes causing the second image-outputting device to output the representative image corresponding to the selected one of the synthesized images in place of the selected one of the synthesized images.

Preferably, the image processing device includes a synthesized image-selecting section that selects one of the synthesized images, and the image output control section includes a selected image output control section that causes the second image-outputting device to output the representative image corresponding to the selected one of the synthesized images in place of the selected one of the synthesized images.

According to these preferred embodiments, by causing the second image-outputting device to output the representative image corresponding to the selected one of the synthesized images in place of the selected one of the synthesized images, it is possible to check whether or not the synthesized image selected to be output by the first image-outputting device is a desired image.

Preferably, the step of storing the image elements includes storing the representative image at a head of a sequence of the image elements.

Preferably, the image storage device stores the representative image at a head of a sequence of the image elements.

According to these preferred embodiments, the representative image is stored at a head of a sequence of the image elements. Therefore, when a synthesized image is output to the first image-outputting device, the image elements thereof can be sequentially read from the image storage device, while when the representative image is output to the second image-outputting device, it can be read from the head of the sequence of image elements stored in the image storage device, which makes it possible to easily confirm the image to be output by the first image-outputting device.

Preferably, the representative image shows a general view of the corresponding one of the synthesized images.

According to this preferred embodiment of each of the first and second aspects of the invention, the representative image shows a general view of the corresponding one of the synthesized images. In other words, by setting an image element showing a general view of the corresponding one of the synthesized images to the representative image, the representative image becomes an image symbolizing the synthesized image.

Preferably, the representative image is different from other representative images respectively corresponding to other ones of the synthesized images.

According to these preferred embodiments, since the representative image is different from other representative images respectively corresponding to other ones of the synthesized images, by viewing the representative image, it is possible to check on whether the image to be output by the first image-outputting device is a desired image.

Preferably, the representative image is characteristic of the corresponding one of the synthesized images and not included in any of other ones of the synthesized images.

According to the preferred embodiment of each of the first and second aspects of the invention, the representative image is characteristic of the corresponding one of the synthesized images and not included in any of other ones of the synthesized images. In other words, by setting an image element which is characteristic of the corresponding one of the synthesized images and not included in any of other ones of the synthesized images to the representative image, the representative image can symbolize the synthesized image.

Preferably, the each of the synthesized images is a color image, and the images elements of the each of the synthesized images are images having respective unicolors different from each other.

According to this preferred embodiment of each of the first and second aspects, the synthesized image is a color image, and the image elements of the synthesized image are unicolor image elements whose colors are different from each other. As described above, even when the image to be output by the first image-outputting device has a plurality of colors, by regarding the same as an image synthesized from a plurality of image elements, each of the image elements having respective unicolors can be caused to be separately output by the second image-outputting device such that the image elements are recognizable. That is, even if the image to be output by the first image-outputting device is a color image formed of a plurality of colors, the representative image which is one of the image elements has a single color or unicolor, so that the second image-outputting device can output the representative image such that it can be recognized. This makes it possible to check on whether the image to be output by the first image-outputting device is a desired image, by using the second image-outputting device. In this case, so long as the second image-outputting device can handle any monochrome image, even if the unicolor of each image element does not match the monochrome color, it can be output as a monochrome image, and hence it is not required to handle a color image, so that the increase in the speed and reduction of costs can be attained. In an extreme statement, the second image-outputting device is only required to be capable of handling two gradation values indicative of validity/invalidity of each pixel of the respective image elements.

Preferably, the each of the synthesized images is a monochrome image having multiple gradation values, and the images elements of the each of the synthesized images are monochrome images having respective different sets of a smaller number of gradation values than the number of said multiple gradation values.

According to this preferred embodiment of each of the first and second aspects of the invention, the synthesized image is a monochrome image having multiple gradation values, and the image elements of the synthesized image are monochrome image elements whose small ranges of gradation values are different from each other. As described above, even when the image to be output by the first image-outputting device is an image having multiple gradation values, by regarding the same as an image synthesized from a plurality of image elements, each of the image elements having respective different gradation values can be caused to be separately output by the second image-outputting device such that the image elements are recognizable. That is, even if the image to be output by the first image-outputting device is a monochrome image having multiple gradation values, the representative image which is one of the image elements has a monochrome color having a smaller number of limited range of gradation values. Therefore, the second image-outputting device can output the representative image such that it is recognizable. This makes it possible to check on whether the image to be output by the first image-outputting device is a desired image, by using the second image-outputting device. In this case, the second image-outputting device is only required to be capable of handling only two gradation values indicative of invalidity and validity of each pixel, and not required to handle multiple gradation values, so that the increase in the speed and reduction of costs can be attained.

Preferably, the second image-outputting device comprises at least one of a display device that outputs an image as a display image displayed on a display screen, and a printing device that outputs an image as a print image printed on a printing object material.

According to this preferred embodiment of each of the first and second aspects of the invention, the second image-outputting device comprises at least one of a display device that outputs an image as a display image displayed on a display screen, and a printing device that outputs an image as a print image printed on a printing object material. That is, the second image-outputting device as the display device or printing device is caused to output the representative image, whereby it can be easily checked on whether the image to be output by the first image-outputting device is a desired image. It should be noted that when the second image-outputting device is a display device, and as described above, when it handles only two gradation values indicative of validity and invalidity of each pixel, the second image-outputting device can carry out determination as to pixels whether each of them is valid or invalid. Therefore, this preferred embodiment is particularly suitable for reduced layout display or when the display screen is small. Further, when the second image-outputting device is a printing device, the present image processing method and device is suitable for provisional printing for confirming a synthesized image by viewing the representative image thereof in place of the synthesized image. Since it is possible to handle the representative image of a synthesized image even if the synthesized image is a color image or amonochrome image having multiple gradation values, so that the processing speed can be increased and the manufacturing costs can be reduced.

Preferably, the first image-outputting device comprises a printing device that outputs an image as a print image printed on a printing object material.

According to this preferred embodiment of the first and second aspects of the invention, the first image-outputting device comprises a printing device that outputs an image as a print image printed on a printing object material. That is, the output image is printed as the print image printed on the printing object material, and hence this preferred embodiment can be applied to printing apparatuses.

Preferably, the printing object material is a tape.

According to this preferred embodiment of each of the first and second aspects of the invention, since the printing object material is a tape, this preferred embodiment can be applied to tape printing apparatuses.

Preferably, the image output from the printing device is printed by an ink jet printing method.

According to this preferred embodiment of each of the first and second aspects of the invention, since the image output from the printing device is printed by an ink jet printing method, this preferred embodiment can applied to printing apparatuses based on an ink jet printing method.

To attain the second object, according to a third aspect of the invention, there is provided a method of processing an image to be processed by an image processing device having a first image-outputting device that is capable of outputting synthesized images such that the synthesized images are recognizable, each of the synthesized images being synthesized from image elements, and a second image-outputting device that is capable of outputting any of the image elements such that the any of the image elements is recognizable only when the second image-outputting device outputs the any of the image elements separately.

The method according to the third aspect of the invention is characterized by comprising the steps of:

storing a substitute image equivalent to each of the image elements, the second image-outputting device being capable of outputting the substitute image such that the substitute image is recognizable, and m−1 image elements of n the image elements (n is an integer equal to or larger than 2, and m is an integer defined as $2 \leq m \leq n$), as m stored image elements corresponding to the each of the synthesized images; and causing the second image-outputting device to output, in place of any one of the synthesized images, the substitute image corresponding to the any one of the synthesized images.

To attain the second object, according to a fourth aspect of the invention, there is provided an image processing device, comprising:

a first image-outputting device that is capable of outputting synthesized images such that the synthesized images are recognizable, each of the synthesized images being synthesized from n image elements (n is an integer equal to or lager than 2);

a second image-outputting device that is capable of outputting any of the n image elements in a recognizable state only when the second image-outputting device outputs the any of the n image elements separately;

an image storage device that stores a substitute image equivalent to each of the image elements, the second image-outputting device being capable of outputting the substitute image such that the substitute image is recognizable, and m−1 image elements of n the image elements (n is an integer equal to or larger than 2, and m is an integer defined as $2 \leq m \leq n$), as m stored image elements corresponding to the each of the synthesized images; and an image output control section that causing the second image-outputting device to output, in place of any one of the synthesized images, the substitute image corresponding to the any one of the synthesized images.

In general, e.g. in the case of a color image to be output for display or printing being a unicolored one, even though the unicolor (single color) is different from any color for monochromatic output, it is possible to output the color image as a monochrome image by converting the single color to a color having a gradation value for monochromatic output, based on gradation values indicative of shading (lightness or darkness) of the respective basic colors composing the single color (e.g. by employing the maximum value or average value of the gradation values of the basic colors). Therefore, even in the case of an output image having a plurality of colors, if the image is regarded as a synthesized image formed by synthesizing unicolor image elements, and the unicolor image elements are output separately on an element-by-element basis, it is possible to output the image elements as monochrome images such that they are recognizable. Further, a monochrome image having a multiple gradation values can be regarded as an image synthesized from a plurality of image elements having respective different sets or ranges of gradation values, and by decomposing the monochrome image into image elements, and outputting each of the image elements separately according to the smaller number or limited range of gradation values, the individual output images i.e. image elements can be recognized though they are output as monochrome images having a smaller number or limited range of gradation values. Therefore, if it is configured such that an image equivalent in respect of unicolors or the smaller number or limited range of gradation values is output as the substitute image, the second image-outputting device lower in the performance than the first image-outputting device can output the image as a recognizable one.

According to this image processing method and device, there is stored a substitute image equivalent to each of the image elements, the second image-outputting device being capable of outputting the substitute image such that the substitute image is recognizable, and m−1 image elements of n the image elements (n is an integer equal to or larger than 2, and m is an integer defined as $2 \leq m \leq n$), as m stored image elements corresponding to the each of the synthesized images, and the second image-outputting device is caused to output, in place of any one of the synthesized images, the substitute image corresponding to the any one of the synthesized images. That is, instead of causing the first image-outputting device to output a synthesized image as a candidate for a desired image, the second image-outputting device is caused to output a substitute image corresponding to the synthesized image, whereby it can be checked whether the synthesized image is an image desired to be output by the first image-outputting device. To do this, more specifically, a substitute image equivalent to each of the image elements and m−1 image elements of n the image elements (n is an integer equal to or larger than 2, and m is an integer defined as $2 \leq m \leq n$) are stored as m stored image elements corresponding to the each of the synthesized images. That is, compared with the conventional method which stores a total of n+1 images consisting of the substitute image and n image elements, only the m image elements are stored as the stored image elements. Therefore, at least the capacity of memory can be saved by an amount corresponding to n−m+1 image element(s). Then, the second image-outputting device is caused to output, in place of any one of the synthesized images, the substitute image corresponding to the any one of the synthesized images. Therefore, it is possible to check on whether the image to be output by the first image-outputting device is a desired image. In this case, the substitute image stored can be output directly as it is, without no extra processing time required for image forming processing or the like.

Therefore, according to the image processing method and device, it possible to easily check on whether a synthesized image to be output by the first image-outputting device is a desired image, by using the second image-outputting device capable of outputting image elements of the synthesized image such that they are recognizable only when each of them is separately output, without extra processing time or an increase in the capacity of memory, which would be otherwise required only for checking on the synthesized image. It will be described hereinafter which m−1 image elements out of the n image elements are stored.

Preferably, the method includes the step of selecting one of the synthesized images, and the step of causing the second image-outputting device to output the substitute image includes causing the second image-outputting device to output the substitute image corresponding to the selected one of the synthesized images, in place of the selected one of the synthesized images.

Preferably, the image processing device includes a synthesized image-selecting section that selects one of the synthesized images, and the image output control section includes a selected image output control section that causes the second image-outputting device to output the substitute image corresponding to the selected one of the synthesized images, in place of the selected one of the synthesized images.

According to these preferred embodiments, by causing the second image-outputting device to output the substitute image corresponding to the selected one of the synthesized images in place of the selected one of the synthesized images, it is possible to confirm that the synthesized image to be output by the first image-outputting device is a desired image.

Preferably, the n image elements include a representative image which symbolizes a corresponding of the synthesized images, and the substitute image is identical to the representative image.

According to this preferred embodiment of the third and fourth aspects of the invention, the n image elements include a representative image which symbolizes a corresponding of the synthesized images, and the substitute image is identical to the representative image. That is, in stead of the synthesized image, the representative image which symbolizes the synthesized image is output by the second image-outputting device, where by even with the second image-outputting device which is only capable of outputting the image elements such that they are recognizable only when each of them is output separately, if the image output thereby is the representative image, it can be output as an recognizable image. Further, since the representative image symbolizes the synthesized image, by viewing the same, it is possible to understand that it has been output in place of the synthesized image, whereby it can be checked whether or not the image to be output by the first image-outputting device is a desired image. Further, in this case, since substitute image is identical to the representative image, these images are not required to be stored redundantly, and only the m=n stored image elements are required to be stored at the maximum, to thereby save the capacity of memory by an amount corresponding to one image element. Further, assuming that m=n, all the n image elements including the substitute image (representative image) are stored, so that by synthesizing them, the resulting synthesized image can be output by the first image-outputting device.

Preferably, the substitute image is an image which permits remaining n−m+1 of the image elements to be generated by execution of logical operations between the image and at least one of the m−1 image elements stored as respective ones of the stored image elements.

According to this preferred embodiment of each of the third and fourth aspects of the invention, the substitute image permits remaining n−m+1 of the image elements to be generated by execution of logical operations between the image and at least one of the m−1 image elements stored as respective ones of the stored image elements. In this case, the m−1 stored image elements are stored, to cause the first image-outputting device to output the synthesized image, logical operations are carried out to generate the remaining n−m+1 image elements to thereby synthesis a total of (M−1)+(n+m+1)=n image elements, and supply the same to the first image-outputting device. That is, compared with the conventional method which stores a total of n+1 images consisting of the substitute image and n image elements, only the m image elements are stored as the stored image elements, whereby the capacity of memory can be saved by an amount corresponding to n−m+1 image element(s), and at the same time, the synthesized image can be output to the first image-outputting device, similarly to the case of storing the n+1 image elements. Further, the substitute image is stored as one of the stored image elements, no extra processing time, e.g. for synthesis is required, but the substitute image can be output to the second image-outputting device as it is, to check on whether the image to be output by the first image-outputting device is a desired image. Further, if the substitute image is identical to the representative image, the capacity of memory can be saved accordingly, and the above logical operations can be omitted to a corresponding extent.

Preferably the step of storing the m stored image elements includes storing the substitute image at a head of a sequence of the stored image elements.

Preferably, the image storage device stores the substitute image at a head of a sequence of the stored image elements.

According to these preferred embodiments, the representative image is stored at a head of a sequence of the stored image elements. Therefore, when a synthesized image is output to the first image-outputting device, the image elements thereof can be sequentially read from the image storage device, while when the substitute image is output to the second image-outputting device, it can be read from the head of the sequence of the stored image elements stored in the image storage device, which makes it possible to easily confirm the image to be output by the first image-outputting device.

Preferably, the substitute image shows a general view of a corresponding one of the synthesized images.

According to this preferred embodiment of each of the third and fourth aspects of the invention, since the substitute image shows a general view of the corresponding one of the synthesized images, by setting an image element showing a general view of the corresponding one of the synthesized images to the representative image, the representative image can be made an image symbolizing the synthesized image.

Preferably, the substitute image corresponding to an arbitrary one of the synthesized images is different from other substitutes images respectively corresponding to other ones of the synthesized images.

According to these preferred embodiments, since the substitute image is different from other substitute images respectively corresponding to other ones of the synthesized images, by viewing the representative image, it is possible to check on whether the image to be output by the first image-outputting device is a desired image.

Preferably, the substitute image corresponding to the arbitrary one of the synthesized images is an image element which is characteristic of the arbitrary one of the synthesized images and not included in the stored image elements of other ones of the synthesized images.

According to the preferred embodiment of each of the third and fourth aspects of the invention, the substitute image is characteristic of the corresponding one of the synthesized images and not included in any of other ones of the synthesized images. In other words, by setting an image element which is characteristic of the corresponding one of the synthesized images and not included in any of other ones of the synthesized images to the representative image, the substitute image can symbolize the synthesized image.

Preferably, the each of the synthesized images is a color image, and the images elements of the each of the synthesized images are images having respective unicolors different from each other.

According to this preferred embodiment of each of the third and fourth aspects of the invention, the synthesized image is a color image, and the m image elements of the synthesized image are unicolor image elements whose colors are different from each other. As described above, even when the image to be output by the first image-outputting device has a plurality of colors, by regarding the same as an image synthesized from a plurality of image elements, each of the image elements having respective unicolors can be caused to be separately output by the second image-outputting device such that the image elements are recognizable. That is, even if the image to be output by the first image-outputting device is a color image formed of a plurality of colors, the substitute image which is one of the image elements has a single color or unicolor, so that the second image-outputting device can output the substitute image such that it can be recognized. This makes it possible to check on whether the image to be output by the first image-outputting device is a desired image, by using the second image-outputting device. In this case, so long as the second image-outputting device can handle any monochrome image, even if the unicolor of each image element does not match the monochrome color, it can be output as a monochrome image, and hence it is not required to be capable of handling a color image, so that the increase in the speed and reduction of costs can be attained. In an extreme statement, the second image-outputting device is only required to be capable of handling two gradation values indicative of validity/invalidity of each pixel of the respective image elements.

Preferably, the each of the synthesized images is a monochrome image having multiple gradation values, and the images elements of the each of the synthesized images are monochrome images having respective different sets of a smaller number of gradation values than the number of said multiple gradation values.

According to this preferred embodiment of each of the third and fourth aspects of the invention, the synthesized image is amonochrome image having multiple gradation values, and the image elements of the synthesized image are monochrome image elements whose small ranges of gradation values are different from each other. As described above, even when the image to be output by the first image-outputting device is an image having multiple gradation values, by regarding the same as an image synthesized from a plurality of image elements, each of the image elements having respective different gradation values can be caused to be separately output by the second image-outputting device such that the image elements are recognizable. That is, even if the image to be output by the first image-outputting device is a monochrome image having multiple gradation values, the representative image which is one of the image elements has a monochrome color having a smaller number or limited range of gradation values, so that the second image-outputting device can output the representative image such that it can be recognized. This makes it possible to check on whether the image to be output by the first image-outputting device is a desired image, by using the second image-outputting device. In this case as well, the second image-outputting device is only required to be capable of handling two gradation values indicative of invalidity and validity of each pixel, and not required to be capable of handling multiple gradation values, so that reduction of costs can be attained.

Preferably, the second image-outputting device comprises a display device that outputs an image as a display image displayed on a display screen.

According to this preferred embodiment of each of the third and fourth aspects of the invention, the second image-outputting device comprises a display device that outputs an image as a display image displayed on a display screen. That is, the second image-outputting device as the display device is caused to output the substitute image, whereby it can be easily checked on whether the image to be output by the first image-outputting device is a desired image. It should be noted that when the second image-outputting device is a display device, and as described above, when it handles only two gradation values indicative of validity and invalidity of each pixel, the second image-outputting device can carry out determination as to pixels whether each of them is valid or invalid. Therefore, this preferred embodiment is particularly suitable for reduced layout display or when the display screen is small.

Preferably, the first image-outputting device comprises a printing device that outputs an image as a print image printed on a printing object material.

According to this preferred embodiment of the third and fourth aspects of the invention, the first image-outputting device comprises a printing device that outputs an image as a print image printed on a printing object material. That is, the output image is printed as the print image printed on the printing object material, and hence this preferred embodiment can be applied to printing apparatuses.

Preferably, the printing object material is a tape.

According to this preferred embodiment of each of the third and fourth aspects of the invention, since the printing object material is a tape, this preferred embodiment can be applied to tape printing apparatuses.

Preferably, the image output from the printing device is printed by an ink jet printing method.

According to this preferred embodiment of each of the third and fourth aspects of the invention, since the image output from the printing device is printed by an ink jet printing method, this preferred embodiment can applied to printing apparatuses based on an ink jet printing method.

The above and other objects, features, and advantages of the invention will become more apparent from the detailed description taken in conjunction with the accompanying drawings.

BRIEF DESCRIPTION OF THE DRAWINGS

FIGS. 6A to 6C are diagrams illustrating a synthesized image which can be printed as a print image and image elements thereof;

FIG. 7 is a diagram illustrating an example of a color conversion table;

FIGS. 8A and 8B are diagrams illustrating an example of the FIG. 6A synthesized image and FIG. 6B image elements being displayed as monochrome images without further processing:

FIGS. 9A and 9B are diagrams similar to FIGS. 8A and 8B, which illustrate another example;

FIGS. 10A and 10B are diagrams similar to FIGS. 8A and 8B, which illustrate still another example:

FIGS. 11A and 11B are diagrams similar to FIGS. 8A and 8B, which illustrate still another example;

FIG. 12 shows a table of synthesized images as candidates of a print image, and image elements stored in a manner associated with each of the synthesized images, and display images, which is useful in explaining the relationship therebetween;

FIGS. 13A and 13B are, diagrams illustrating an example of image elements of a synthesized image corresponding to an image No. 1 in FIG. 12 and a representative image of the image elements;

FIGS. 15A and 15B are diagrams similar to FIGS. 13A and 13B, which illustrates a case of still another synthesized image being stored as the image No. 1 in FIG. 12;.

FIGS. 16A and 16B are diagrams illustrating an example of image elements of a synthesized image corresponding to an image No. 2 in FIG. 12 and a representative image of the image elements;

FIGS. 17A and 17B are diagrams illustrating an example of image elements of a synthesized image corresponding to images No. 3 and No. 4 in FIG. 12 and a representative image of the image elements;

FIG. 18 is a diagram illustrating an example of a representative image of image elements of a synthesized image corresponding to an image No. 5 in FIG. 12;

FIG. 19 is a diagram illustrating an example of the image elements of the synthesized image corresponding to an image No. 5 in FIG. 12;

FIG. 20 shows another example of a synthesized image which has no suitable image element which can symbolize the synthesized image:

DETAILED DESCRIPTION

Figure 1:
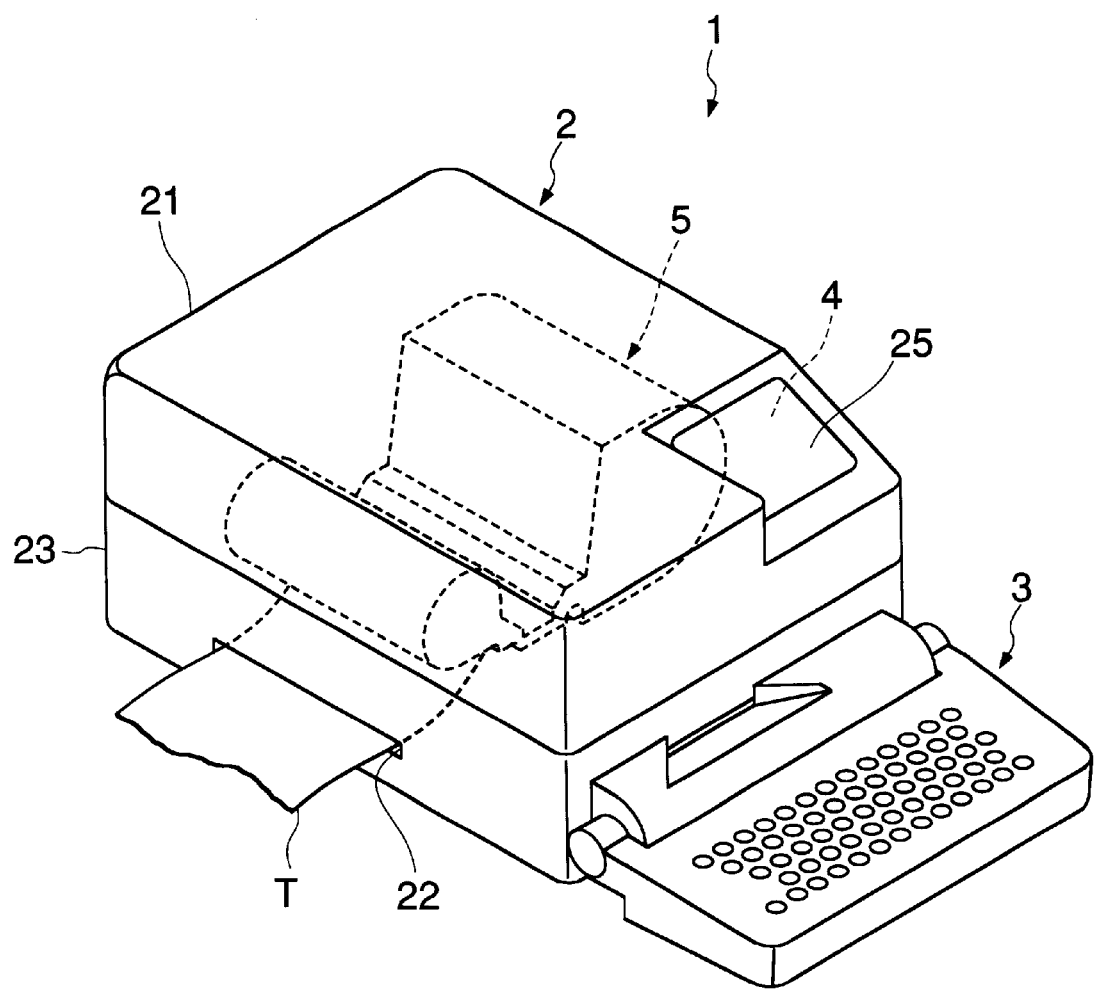
FIG. 1 is a perspective view of an appearance of a tape printing apparatus to which is applied an image processing method and device according to the invention.
Figure 2:
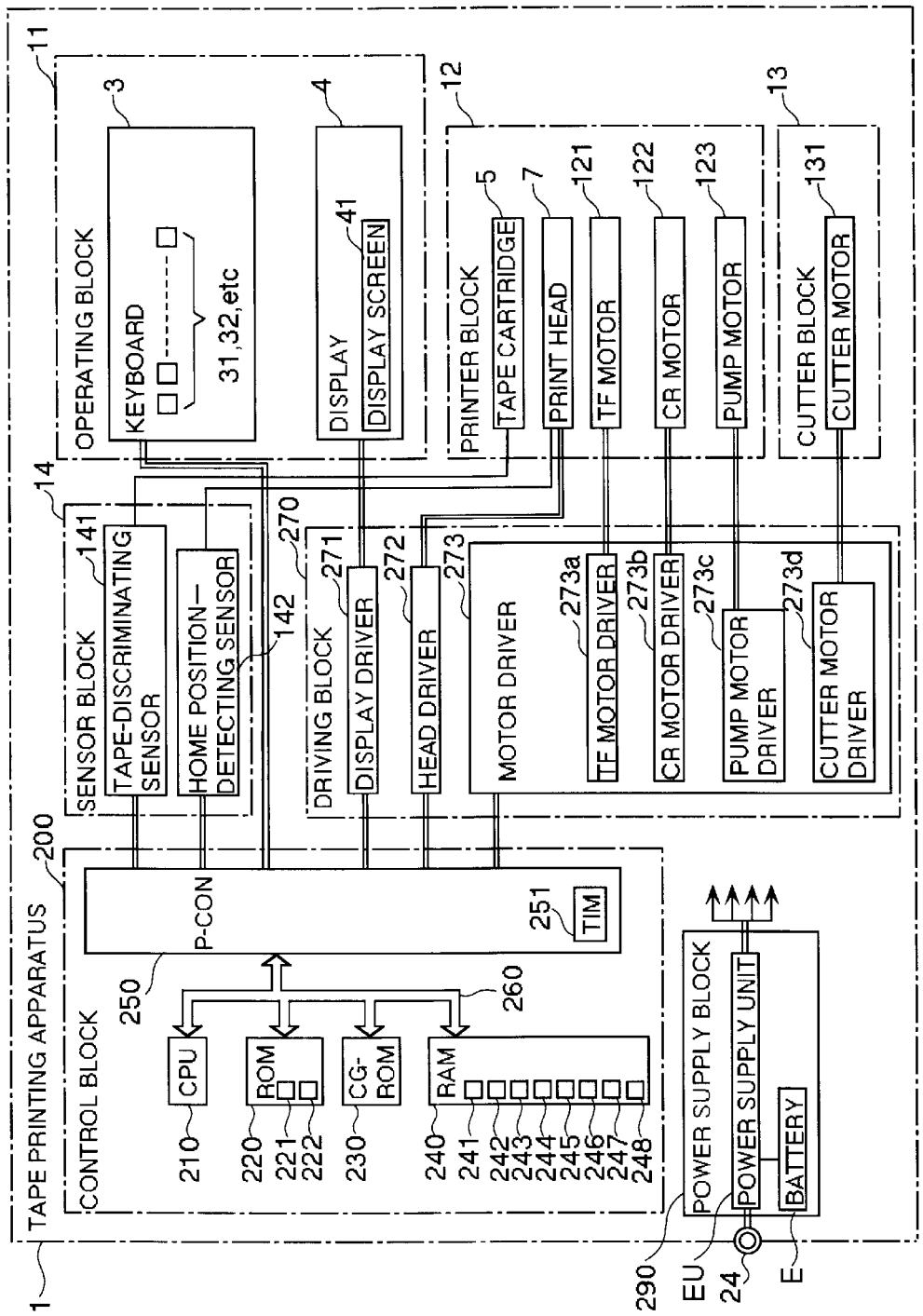
FIG. 2 is a block diagram of a control system of the FIG. 1 tape printing apparatus.

The invention will now be described in detail with reference to the drawings showing an embodiment thereof. In the embodiment, an image processing method and device according to the invention is applied to a tape printing apparatus. FIG. 1 is a perspective view of an appearance of the tape printing apparatus, and FIG. 2 is a block diagram of a control system thereof.

The tape printing apparatus 1 is capable of carrying out color printing of a print image on a printing tape T1 by an ink jet printing method as well as cutting off the printed portion of the printing tape T1 to thereby produce a label. The print image is formed based on desired characters and the like entered via a keyboard of the apparatus 1. Further, the tape printing apparatus 1 is capable of mounting not only the printing tape T1 but also a laminating tape T2 (see FIGS. 3 and 4) to thereby affix the laminating tape T2 to a printed portion of the printing tape T1 and cut the printing tape T1 and the laminating tape T2 in the laminated state, for producing a laminated label. Hereinafter, a type of tape formed of only the printing tape T1 and a type of tape formed of both the printing tape T1 and the laminating tape T2 (to be) added thereto will be generically referred to as the "tape T".

The printing tape T1 is comprised of a substrate tape, an adhesive layer coated on an underside surface of the substrate tape, and a release paper tape affixed to the adhesive layer. The substrate tape is formed of a material which is capable of readily absorbing ink, such as paper, paper with a coated layer or a film with a coated layer. The adhesive layer is used for affixing a printing tape T1 as a label to an object article, such as a file, while the release paper tape is used for preventing dust or dirt from depositing on the adhesive layer.

The laminating tape T2 is comprised of a substrate tape, and an adhesive layer coated on an underside surface of the substrate tape. The substrate tape is formed of a transparent film having a thickness of approximately 16 to 38 μm. The printing tape T1 and the laminating tape T2 are generally fabricated to have identical widths and affixed to each other in a manner such that side ends thereof are aligned one upon the other. Actually, the laminating tape T2 has a slightly smaller width (by approximately 0.3 mm) than the printing tape T1 such that slight lateral displacement of the laminating tape T2 can be accommodated when the same is affixed to the printing tape T1.

Tape cartridges are provided which contain various (approximately ten) kinds of tapes T with various tape widths of from 4.5 mm to 96 mm. A print image having a resolution of 24 to 1024 dots in the direction of the width thereof is printed on the printing tape T, dependent on the width thereof. It should be noted that there are provided still other tapes T different in material or having background colors other than white. Therefore, it is possible to use at least several tens of kinds of tapes T including ones to be adopted in the future. The tape cartridges 5 are classified into a type which contains both a printing tape T1 and a laminating tape T2 and another type which contains only a printing tape T1 (see FIG. 4), and each include three kinds of tape cartridges, such as "large", "medium" and "small", different in width.

Referring to FIG. 1, the tape printing apparatus 1 is comprised of an apparatus body 2, a keyboard 3 mounted on a front surface of the apparatus body 2, a tape cartridge 5 containing a tape T (printing tape T1+laminating tape T2: see FIG. 3), and an ink cartridge 8 (see FIG. 3) filled with four colors of ink. The tape cartridge 5 and the ink cartridge 8 are removably loaded within the apparatus body 2. The apparatus body 2 has an apparatus casing 23 upper part of which is formed by a lid 21 which can be opened and closed for inserting and removing (i.e. loading and unloading) the tape cartridge 5 and the ink cartridge 8. In a side wall of the apparatus casing 23 is formed a tape exit 22 in the form of a slit through which the tape T is sent out of the apparatus 1.

The keyboard 3 is hinged on a lower portion of the front surface of the body 2 of the tape printing apparatus 1 such that it can be brought either to an upright position or to a horizontal position for use with the body 2. When the apparatus 1 is used for printing, the keyboard 3 is brought to the horizontal position, whereas when the same is carried by the user, the keyboard 3 is brought to the upright or folded position. In a right-side front portion of the lid 21 is formed a small window 25 which, when the lid 21 is closed, corresponds in location to a display 4 incorporated in the apparatus body 2. The keyboard 3 and the display 4 will be described hereinafter.

Further, as shown in FIG. 2, the tape printing apparatus 1 is basically comprised of an operating block 11 having the keyboard 3 and the display 4 and interfacing with the user, a printer block 12 having a print head 7 of an ink jet type for printing on a tape T (printing tape T1) unwound from the tape cartridge 5, a cutter block 13 for cutting off the printed portion of the tape T, a sensor block 14 having various sensors for carrying out various detecting operations, a driving block 270 having various drivers for driving circuits of blocks and devices, a power supply block 290, and a control block 200 for controlling operations of components of the tape printing apparatus 1 including the above-mentioned sensors and drivers.

To implement the above construction, the apparatus casing 23 accommodates a circuit board, not shown, in addition to the printer block 12, the cutter block 13, the sensor block 14 and so forth. On the circuit board are mounted the power supply block 290 and the circuits of the driving block 270 and the control block 200. A power supply unit EU of the power supply block 290 is connected to a connector socket 24 connectable with an AC adapter and a battery E, such as a nicad battery, removably mounted from the outside of the casing 2, so as to supply power to the components of the tape printing apparatus 1.

Figure 3:
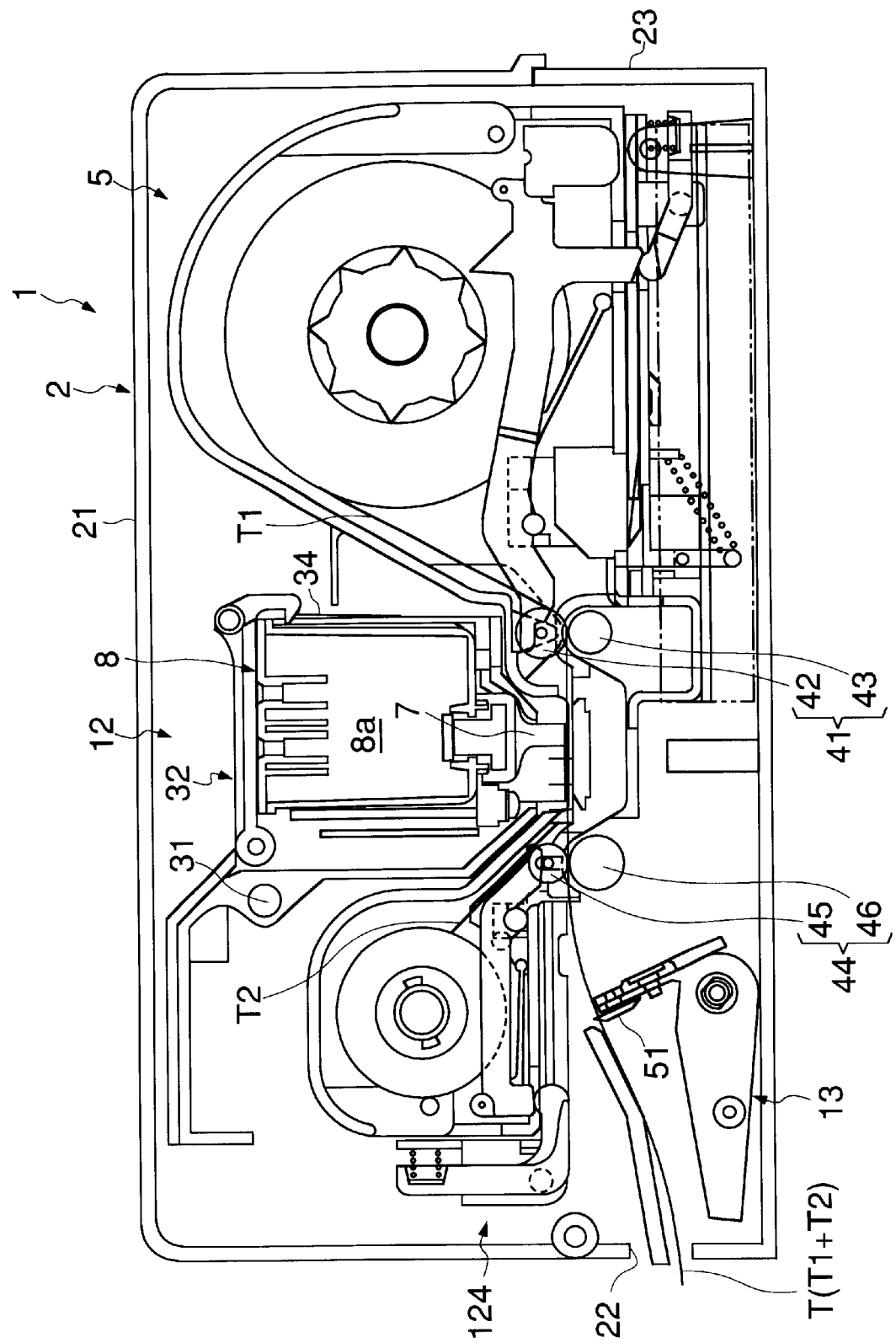
FIG. 3 is a cross-sectional view of a body of the FIG. 1 tape printing apparatus.

FIG. 3 is a side sectional view of the body 2 of the tape printing apparatus 1. Referring to FIGS. 2 and 3, the printer block 12 includes a carriage guide shaft 31 having opposite ends thereof supported on a frame, not shown, a carriage 32 slidably attached to the carriage guide shaft 31, a timing belt, not shown, which is driven in a forward or reverse direction to move the carriage 32 in the direction of the width of the tape T in a reciprocating manner, a carriage motor (CR motor) 122 for driving the timing belt in a forward or reverse direction, feed roller means 41 comprised of a feed driven roller 42 positioned above and a feed drive roller 43 positioned below, laminating roller means 44 comprised of a laminating driven roller 45 positioned above and a laminating drive roller 46 positioned below, a tape feed motor (TF motor) 121 for driving the feed drive roller 43 and the laminating drive roller 46 for rotation via a reduction gear train, not shown, a head cap mechanism, not shown, for closing the ink nozzles of the print head 7 as well as cleaning the same by using a pump motor 123 as required, and an ejection mechanism 124 for loading and ejecting the tape cartridge 5.

On the carriage 32 are integrally mounted the print head 7 for printing on the tape T, at a lower portion thereof, and a cartridge holder 34, at an upper portion of the same, for holding therein the ink cartridge 8 for supplying ink to the print head 7. In this case, the print head 7 is mounted on the carriage 32 in a manner facing downward, and the ink cartridge 8 is held in the cartridge holder 34 in a manner facing downward. When the ink cartridge 8 is loaded in the cartridge holder 34, ink from the ink cartridge 8 is allowed to flow from four ink reservoirs 8a to the print head 7. The ink reservoirs 8a are filled with C (cyan) ink, M (magenta) ink, Y (yellow) ink, and K (black) ink, respectively.

Further, the carriage 32 has light shields, not shown, projecting therefrom. When one of the light shields is brought before a home position sensor 142 comprised of a photo interrupter or the like, the print head 7 is detected to be at a home position, not shown, whereby the correction of the position of the print head 7, such as zero position adjustment, is carried out. The home position serves not only as a standby position of the print head 7 but also as a reference position for printing. The CR motor 122 is driven for rotation in a predetermined number of steps to move the print head 7 from the reference position, whereby the carriage 32 is moved with accuracy to each position in the direction of the width of the tape T within a printing range, and the print head 7 is driven for printing in synchronism with movement of the carriage 32 to thereby effect printing of characters and figures on a surface of the tape T in a desired manner.

Figure 4:
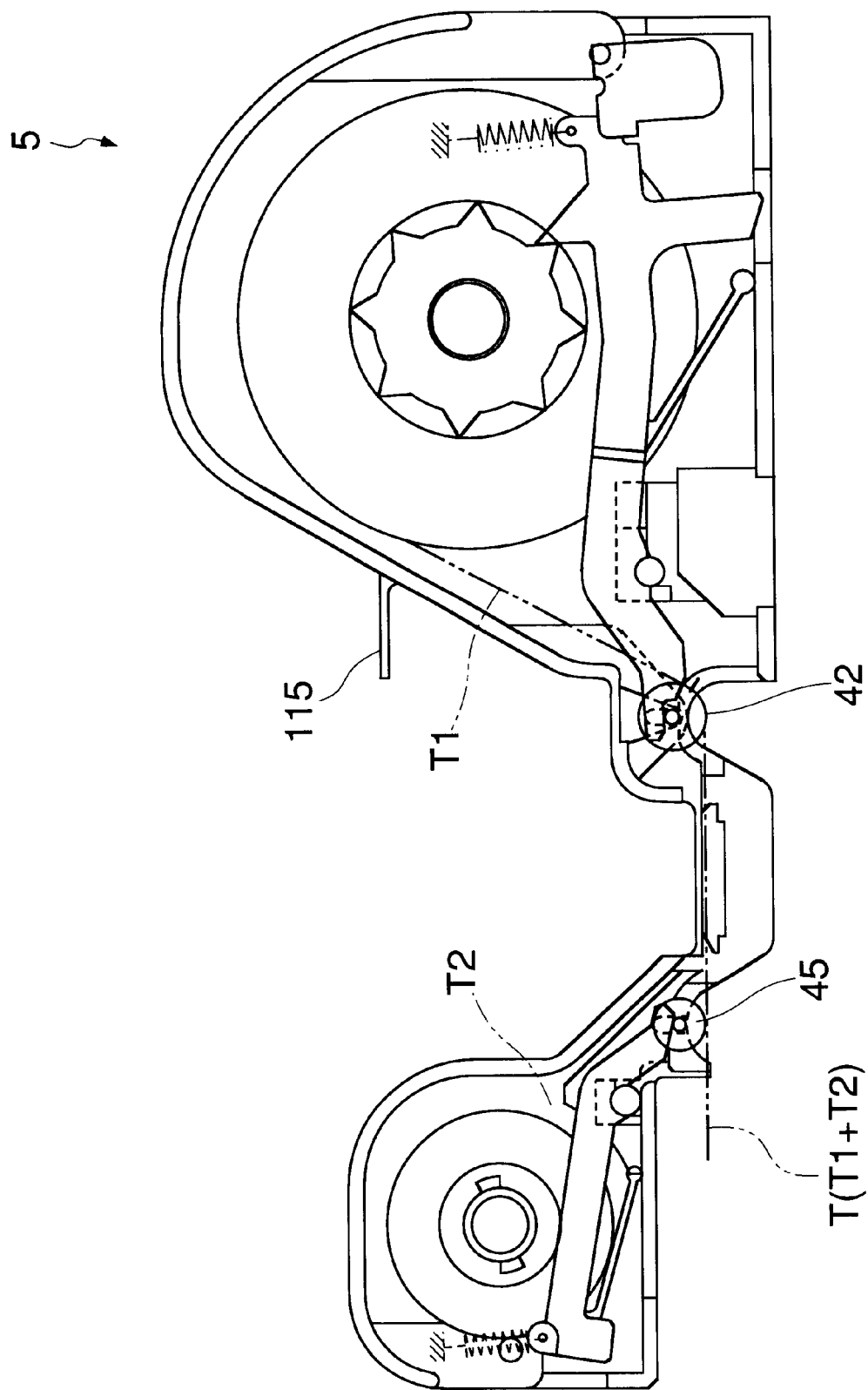
FIG. 4 is a cross-sectional view of a tape cartridge for being mounted in the FIG. 1 tape printing apparatus.

The tape cartridge 5 includes a discriminating plate 115 for designating discriminating information based on bit patterns or the like (see FIG. 4). A tape-discriminating sensor 141 mounted on the above-mentioned carriage 32 is caused to face toward the discriminating plate 115 to thereby detect a type of a tape cartridge 5, a type of a printing tape T1 and a type of a laminating tape T2 as well as a print-starting position at which the printing tape T1 starts to be printed. Hereinafter, signals indicative of the sensed types and print-starting position are referred to as the "tape-discriminating signals".

The feed drive roller 43 is arranged in the apparatus body 2, while the feed driven roller 42 is arranged in the tape cartridge 5. When the tape cartridge 5 is loaded in the body 2, the feed driven roller 42 presses the printing tape T1 in a manner sandwiching the tape T1 between the feed drive roller 43 and the feed driven roller 42 itself. The printing tape T1 is advanced in this state as the TF motor 121 rotates.

The laminating drive roller 46 is arranged in the body 2, while the laminating driven roller 45 is arranged in the tape cartridge 5. When the tape cartridge 5 is loaded in the body 2, the laminating driven roller 45 presses the printing tape T1 and the laminating tape T2 in a manner sandwiching them between the laminating drive roller 46 and the laminating driven roller 45 itself. The printing tape T1 and the laminating tape T2 are advanced in this state while being affixed to each other as the TF motor 121 rotates.

The cutter block 13 includes a cutter 51 and a cutter motor 131 for driving the cutter 51 for cutting operations. After the printing is completed, the tape T (printing tape T1+laminating tape T2) is stopped when the TF motor 121 further feeds the same by a predetermined number of steps, whereupon the cutter motor 131 is driven to cut off the tape T. It should be noted that the tape printing apparatus 1 is provided with a cut key, not shown, for enabling the user to manually cut the tape by key stroke, and it is possible to switch between an automatic cutting mode and a manual cutting mode.

Referring to FIG. 2, the sensor block 14 includes the tape-discriminating sensor 141 and the home position sensor 142. As described hereinabove, the tape-discriminating sensor 141 discriminates the types of tape cartridge 5 and tape T to generate a discriminating information signal indicative of the sensed types of the tape cartridge 5 and tape T, and detects the print-starting position for starting a printing operation on the printing tape T1 to generate a signal indicative of detection of the print-starting position. These signals are supplied to the control block 200. The home position sensor 142 detects that the print head 7 has reached the home position and generates a position-detecting signal indicative of detection of the home position of the print head 7, which is also supplied to the control block 200. It should be noted that in the sensor block 14 can be provided other sensors, such as a voltage sensor which is connected to the power supply unit EU of the power supply block 290 for supplying power to the components of the tape printing apparatus 1 and detects changes in the electric potential of the power supply unit EU, an ambient temperature sensor, a head surface temperature sensor and the like, or some of them can be omitted to suit the actual requirements of the apparatus.

The driving block 270 includes a display driver 271, a head driver 272, and a motor driver 273. The display driver 271 drives the display 4 of the operating block 11 in response to control signals delivered from the control block 200, i.e. in accordance with commands carried by the signals. Similarly, the head driver 272 drives the print head 7 of the printer block 12 in accordance with commands from the control block 200. Further, the motor driver 273 has a TF motor driver 273a for driving the TF motor 121 of the printer block 12, a CR motor driver 273b for driving the CR motor 122 of the printer block, a pump motor driver 273c for driving the pump motor 123 of the printer block, and a cutter motor driver 273d for driving the cutter motor 131 of the cutter block 13, and similarly to the display driver 271 and the head driver 272, drives each motor in accordance with commands from the control block 200.

The operating block 11 includes the keyboard 3 and the display 4. The display 4 has a display screen 40 which is capable of displaying display image data of 96×64 dots on a rectangular display area of approximately 6 cm in the horizontal direction (X direction)×4 cm in the vertical direction (Y direction). The display 4 is used by the user when he enters data via the keyboard 3 to form or edit matrix data representative of a character string image having characters (the term "characters" being used to mean letters, numerals, symbols, simple figures, etc., as described above) arranged therein and a print image including the character string image, view the resulting data, and enter various commands including ones for selection via the keyboard 3.

On the keyboard 3, there are arranged a character key group 31 including an alphabet key group, not shown, a symbol key group, not shown, a number key group, not shown, and a nonstandard character key group, not shown, for calling nonstandard characters for selection, as well as a function key group 32 for designating various operation modes. In a type of the apparatus 1 which is capable of entering the Japanese language, there is also provided a kana key group, not shown, for entering Japanese hiragana letters and Japanese katakana letters.

The function key group 32 includes a power key, not shown, a print key, not shown, for instructing a printing operation, a form key, not shown, for displaying selection screens for switching between various operating modes such as character size-related modes, decorations-related modes, etc. as well as between various forms, a selection key, not shown, for finally determining entry of character data and starting new lines during text entry as well as determining selection of one of the various operating modes on a corresponding one of the selection screens, a color specification key, not shown, for specifying printing colors including neutral colors (mixed colors) of print image data, a color-setting key, not shown, for setting colors of characters and background colors, and four cursor keys (up arrow key, down arrow key, left arrow key, and right arrow key), not shown, for moving the cursor or the display range of print image data on the display screen 40 in respective upward, downward, leftward, and rightward directions.

The function key group 32 also includes a cancel key, not shown, for canceling instructions, a shift key, not shown, for use in changing roles of respective keys as well as modifying registered image data, an image key, not shown, for alternately switching between a text entry screen or a selection screen and a display screen (image screen) for displaying print image data, a proportion-changing (zoom) key, not shown, for changing a proportion between the size of print image data and the size of display image data displayed on the image screen, and the cutting key for manually cutting the tape T.

Similarly to keyboards of the general type, the above key entries may be made by separate keys exclusively provided for respective key entries and/or by a smaller number of keys operated in combination with the shift key or the like. Here, for purposes of ease of understanding, the following description will be made assuming that there are provided as many keys as described above.

As shown in FIG. 2, from the keyboard 3, various commands and data described above are input to the control block 200.

The control block 200 includes a CPU 210, a ROM 220, a character generator ROM (CG-ROM) 230, a RAM 240, and a peripheral control circuit (P-CON) 250, all of which are connected to each other by an internal bus 260.

The ROM 220 has a control program area 221 for storing control programs executed by the CPU 210 as well as a control data area 222 for storing control data including a color conversion table, a character modification table, a dither matrix, a predetermined basic (prescript) dither matrix and the like. The CG-ROM 230 stores font data, i.e. data defining characters, symbols, figures and the like, provided for the tape printing apparatus 1. When code data identifying a character or the like is input thereto, it outputs the corresponding font data.

The RAM 240 is backed-up such that stored data items can be preserved even when the power is turned off by operating the power key. The RAM 240 includes areas of a register group 241, a text data area 242 for storing text data of characters or the like entered by the user via the keyboard 3, a display image data area 243 for storing image data displayed on the display screen 40, a print image data area 244 for storing print image data, a registered image data area 245 for storing registered image data, a dither mask area 246 for storing a dither mask being processed or already processed, a color pallet data area 247 for storing color pallet information, such as printing colors or the like, and buffer areas 248 including a character image-forming buffer (font color buffer), a color conversion buffer, a color-by-color dithered image matrix-arranging buffer, a print buffer, and so forth. The RAM 240 is used as a work area for carrying out the control process.

The P-CON 250 incorporates a logic circuit for complementing the functions of the CPU 210 as well as handling interface signals for interfacing between the CPU 210 and peripheral circuits. The logic circuit is implemented by a gate array, a custom LSI and the like. A timer (TIM) 251, for instance, is also incorporated in the P-CON 250 for the function of measuring elapsed time. The P-CON 250 is connected to the sensors of the sensor block 14 and the keyboard 3, for receiving the signals generated by the sensor block 14 as well as commands and data entered via the keyboard 3, and inputting these to the internal bus 260 directly or after processing them. Further, the P-CON 250 cooperates with the CPU 210 to output data and control signals input to the internal bus 260 by the CPU 210 or the like, to the driving block 270 directly or after processing them.

The CPU 210 of the control block 200 receives the signals and data from the components of the tape printing apparatus 1 via the P-CON 250, according to the control program read from the ROM 220, processes font data from the CG-ROM 230 and various data stored in the RAM 240, and delivers signals and data to the components of the tape printing apparatus 1 via the P-CON 250 to thereby carry out position control during printing operations, display control of the display screen 40, and print control that causes the print head 7 to carry out printing on the tape T under predetermined printing conditions. In short, the CPU 210 controls the overall operation of the tape printing apparatus 1.

Next, the overall control process carried out by the tape printing apparatus 1 will be described with reference to FIG. 5. As shown in the figure, when the program for carrying out the control process is started e.g. when the power key is depressed (the power of the tape printing apparatus 1 is turned on), first, at step S1, initialization of the system including restoration of saved control flags is carried out to restore the tape printing apparatus 1 to the state it was in before the power was turned off the last time. Then, the image that was displayed on the display screen 40 before the power was turned off the last time is shown as an initial screen at step S2.

Figure 5:
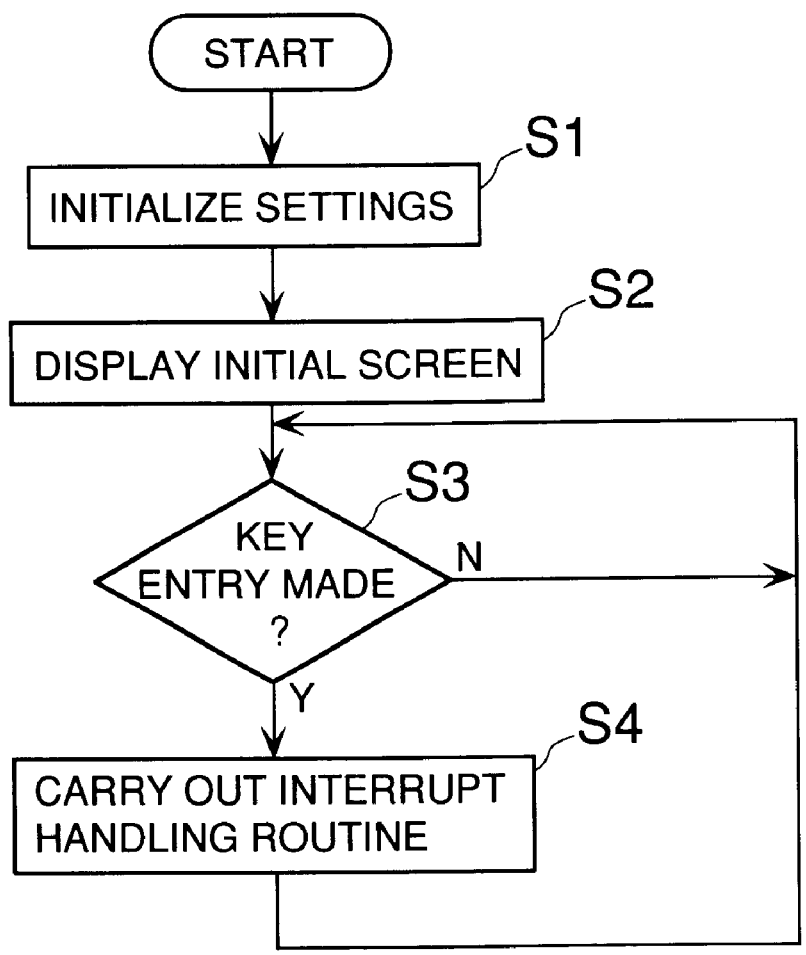
FIG. 5 is a flowchart showing a conceptual representation of an overall control process executed by the FIG. 1 tape printing apparatus.

The following steps in FIG. 5, that is, step S3 for determining whether or not a key entry has been made and step S4 for carrying out an interrupt handling routine are conceptual representations of actual operations. Actually, when the initial screen has been displayed at step S2, the tape printing apparatus 1 enables an interrupt by key entry (keyboard interrupt), and maintains the key entry wait state (No to S3) until a keyboard interrupt is generated. When the keyboard interrupt is generated (Yes to S3), a corresponding interrupt handling routine is executed at step S4, and after the interrupt handling routine is terminated, the key entry wait state is again enabled and maintained (No to S3).

As described above, in the tape printing apparatus 1, main processing operations by the apparatus 1 are carried out by interrupt handling routines, and hence if print image data for printing is provided or has been prepared, the user can print the image data at a desired time point, by depressing the print key to thereby generate an interrupt by the print key and start a printing process.

Next, description will be made of image-outputting means provided for the tape printing apparatus 1, for outputting image data. In the tape printing apparatus 1 which is basically a printer, as described hereinbefore with reference to FIG. 2, etc., the image-outputting means is primarily formed by the printer block (printing means, first image-outputting device) 12 for outputting (i.e. printing) image data on the tape T (printing tape T1) unwound from the tape cartridge 5, via the print head 7 of an ink jet type, and secondarily by the display (display means, second image-outputting device) 4 of the operating block 11 for outputting (i.e. displaying) a display image represented by display image data on the display screen 40 so as to enable the user to form or edit print image data representative of a print image including a character string image having characters arranged therein and view the resulting image data.

First, the printer block (printing means, first image-outputting device) 12 will be described. Since the tape printing apparatus 1 is basically used as a printer as described above, its performance is evaluated based on results of printing. Therefore, the printer block 12 is capable of printing of a print image (output image) equivalent to a color image with 256 gradation levels. For printing, print image data representative of a print image is provided or prepared as color image data. More specifically, the color of each pixel of a color image is represented by gradation values of respective basic colors. The basic colors are four colors C, M, Y and K (black) which is a mixture of the three primary colors C, M, and Y. The color of each pixel of the print image (color image) is decomposed into gradation values indicative of respective gradation levels of the basic colors, based on print image data (color image data) representative of the print image (color image), and then, each pixel is printed (or output) in a density corresponding to the gradation value on a basic color-by-basic color basis. As a result, the colors of the respective pixels of the print image are expressed by a so-called subtractive color mixing process, whereby the print image (color image) is printed (output).

To be more precise, the tape printing apparatus 1 is of an ink jet type, as described above, which performs printing of each pixel of a print image (color image), based on determination as to whether or not a droplet of ink of each color is to be ejected for printing. That is, basically, the apparatus 1 can print only a color image with two gradation levels per color. In general, to output image data (gradation image data) having information of an n-valued gradation value (n=256 in this embodiment) assigned to each pixel, to image-outputting means capable of processing only image data with a smaller number or limited range of gradation values (2-valued gradation value in this embodiment) representative of respective gradation levels, it is required to convert the above image data to one (pseudo-gradation image data) adapted to the limited number of gradation values. For this reason, in the tape printing apparatus 1, a so-called dither method which is one of methods used in such image conversion (compression) processing, that is, pseudo-gradation processing is employed, and as a result of the pseudo-gradation processing (dithering) by the dither method, a pseudo-gradation image is obtained as a print image. Thus, the print image (output image) equivalent to a color image with 256 gradation levels can be printed. The present assignee filed Japanese Patent Application No. 10-312563 which discloses this kind of image-printing method and device, so that detailed description thereof is omitted, and only an outline thereof will be described below.

The so-called dither method is employed to add noise to gradation values of pixels constituting gradation image data of an original image and then carry out binarization (binary dither method) or limited multi-valued conversion (multi-valued dither method) on values resulting from the noise addition. This method takes advantage of the integrating function of human eyes that recognize contents in an area as a shade or a color. In the binary dither method, for instance, the ratio of assignment of two numerical values (e.g. 1's and 0's) to matrix elements of a matrix is changed according to the gradation values of respective pixels of an input gradation image (for instance, by thinning "1's" in the matrix according to the gradation values under a predetermined rule) to thereby represent intermediate gradation (for instance, a gray color represented by setting 1's and 0's to black and white, respectively).

A typical binary dither method is a systematic dither method. In the systematic dither method, first, for comparison with n-valued gradation values each defined by any one of n possible numerical values (n is an integer equal to or larger than 3: n=256 in this embodiment) and assigned to pixels forming an original gradation image, a dither matrix of thresholds each defined by any one of m possible numerical values (m is an integer satisfying a condition of $n \geq m \geq 2$) and arranged therein as matrix elements is prepared beforehand. Next, (the matrix of) the original gradation image is divided into matrices each having the size of the dither matrix, and the gradation values of the respective elements of each of the divisional matrices and the corresponding thresholds of the dither matrix are compared with each other on an element-by-element basis to determine whether or not a gradation value satisfies a condition designated by a corresponding threshold. According to results of the determination, either of the numerical values 1 and 0 is assigned to each pixel to thereby form a pseudo-gradation image represented by a binary matrix. For instance, if the gradation value of a matrix element satisfies a condition designated by a corresponding threshold, a numerical value (e.g. 1) indicating validity of the gradation value is assigned to a corresponding matrix element, whereas if the gradation value does not satisfy the condition, a numerical value (e.g. 0) indicating invalidity of the gradation value is assigned to the corresponding matrix element, whereby a pseudo-gradation image represented by a two-valued (binary) matrix (i.e. of matrix elements each having a value 1 or 0) is formed.

In the tape printing apparatus 1, however, not dither matrices but dither masks each identical in size to a corresponding one of the dither matrices and corresponding to a designated gradation value are utilized. Each dither mask is provided as a matrix in which a validity-indicative one (e.g. 1) of two predetermined numerical values (e.g. 1 and 0) is assigned to each matrix element corresponding in matrix element location to each threshold of the dither matrix whose condition is satisfied by a designated gradation value, whereas an invalidity-indicative one (e.g. 0) of the two predetermined numerical values is assigned to each matrix element corresponding in matrix element location to each threshold of the dither matrix whose condition is not satisfied by the designated gradation value. Further, elementary shape image data items each representing an image of a shape of an image element (hereinafter referred to as "elementary shape image")(which will be illustrated hereinbelow with reference to FIGS. 6A to 6C) by a two-valued (binary) matrix are prepared, and a logical AND operation is performed between each matrix element of each of the matrices of the respective elementary shape images, each of the matrices having the same size as that of a corresponding dither mask, and a corresponding one (corresponding in matrix element location) of the matrix elements of the dither mask, such that the validity-indicative value is output only when both a matrix element of each of the matrices of the respective elementary shape images and a corresponding matrix element of the dither mask have the validity-indicative value. As a result of the logical AND operations, there is produced a pseudo-gradation image element represented by a predetermined binary matrix having a size identical to that of the elementary shape image.

In short, the tape printing apparatus 1 is capable of producing dithered pseudo-gradation images corresponding to respective image elements (hereinafter referred to as "dithered image elements") by preparing such various dither masks (corresponding to respective designated gradation values) as described above. Accordingly, for instance, if dither masks corresponding to the gradation values of the respective basic colors are prepared, and dithered image elements are produced on a basic color-by-basic color basis and printed, pseudo-gradation images corresponding to the respective image elements are eventually printed. Further, if the dithered image elements are synthesized on a basic color-by-basic color basis to form whole (synthesized) pseudo-gradation images (hereinafter referred to as "synthesized pseudo-gradation images") on a basic color-by-basic color basis, and the color-by-color synthesized pseudo-gradation images are printed, a pseudo-gradation image corresponding to a synthesized image obtained by synthesizing the image elements is eventually printed. It should be noted that the conventional binary dither method (systematic dither method) may be used in the present embodiment because the object of the invention does not lie in providing a particular dither method.

Next, description will be made of print images (color images) which can be printed by the printer block (printing means, first image-outputting device) 12. In the tape printing apparatus 1, it is possible to register figures and the like as registered nonstandard characters or registered images represented by dot maps. Among them, so-called nonstandard characters can be treated similarly to the above-mentioned characters or the like, and figures can be handled, if they are simple, similarly to the characters by making the same available as members of a font or nonstandard characters. Hence, in the following, registered figures that normally cannot be handled similarly to characters will be described. Further, for convenience of illustration of figures and explanation thereof (for efficiency of description) as well as for purposes of ease of understanding, an example of figures based on five gradation values 0 to 4 (n=5) will be described. Although in such a case, $2^k$ gradation values 0 to ($2^k$–1) (k is a natural number equal to or larger than 2), such as 64 gradation values 0 to 63, and 256 gradation values 0 to 255, are normally used for efficiency of binary digital information, in the following, five gradation values 0 to 4 are employed with preference to ease and clarity of explanation.

For instance, the form key is operated in a state of the text entry screen being displayed on the display screen 40, to display the selection screen and switch the same to a screen for registering image data, and then, similarly to the case of so-called nonstandard character registration, the cursor key is operated in a state of the shift key being depressed, whereby values (the validity-indicative value "1", the invalidity-indicative value "0" and the like) assigned to pixels (dots) on a cursor path are reversed ("1"→"0", or "0"→"1"), or alternatively, for instance, the selection key is operated in a state of the sift key being depressed when a starting point is pointed by the cursor and when an ending point is pointed by the same, thereby designating the starting point and the ending point and changing values of pixels in a rectangular area having a diagonal line connecting the dot of the starting point and the dot of the ending point. A figure or diagram is drawn in such a manner by using a dot image, and registered (stored with a registration number) in the registered image data area 245 in the RAM 240. In the following, description will be made assuming that a figure now drawn (or a figure registered in the immediately preceding occasion or registered before and now read out again from the RAM) is a figure of a no-smoking mark appearing in FIG. 6A.

On the display screen 40 of the display 4 with the figure of the no-smoking mark displayed thereon, the color specification key is operated to thereby designate the gradation values of C (cyan), M (magenta) and Y (yellow) based on color information (hereinafter referred to as "color pallet information") defined in a color conversion table shown in FIG. 7, for instance. Then, colors of portions of the figure are designated by operating the color-setting key for setting the same. This figure of the no-smoking mark can be decomposed into image elements shown in FIG. 6B, for instance. Further, if a dot-shaded portion in each of the illustrated image elements is regarded as an elementary object image and the other portion therein as an elementary background image, each image element can be decomposed into the elementary object image and the elementary background image, and image data items distinctly representative of the decomposed images can be formed. That is, the validity-indicative value "1" can be assigned to the pixels (dots) of the elementary object image of each image element, while the invalidity-indicative value "0" is assigned to the pixels (dots) of the elementary background image of the same, whereby elementary shape image data which is binary matrix data representative of an image (elementary shape image) of each image element (elementary object image, to be precise) can be prepared (formed).

For instance, by the color specification/setting process described above, a red color (i.e. the gradation value of the color C is "0", that of the color M "4", and that of the color Y "0") is designated for the elementary object image (dot-shaded portion), appearing in FIG. 6B, of the elementary shape image represented by elementary shape image data SG1 (hereinafter, "an elementary shape image represented by elementary shape image data SGx" (x represents a numeral) is simply referred to as "an elementary shape image SGx")(see No. 6 in FIG. 7). Further, e.g. a blue color (i.e. the gradation value of the color C is "4", that of the color M "4", and that of the color Y "0") is designated for the elementary object image (dot-shaded portion) of the elementary shape image SG2 (see No. 7 in FIG. 7), and a light gray color (the gradation values of the colors C, M, and Y are all "1") for the elementary object image (dot-shaded portion) of the elementary shape image SG3 (see No. 5 in FIG. 7). Each of data items CP1, CP2, and CP3 indicative of color pallet information of the respective colors C, M, and Y (hereinafter referred to as "color pallet data items") is stored in the color pallet data area 247 of the RAM 240 as a designated gradation value (primary color gradation value) of a corresponding one of the elementary object images.

Then, a logical AND operation is performed between each of the elementary shape images SG1, SG2, and SG3 and a corresponding one of the dither masks corresponding to the respective designated gradation values, based on a corresponding one of the color pallet data items CP1, CP2, and CP3. As a result of the logical AND operation, there is produced a pseudo-gradation image (dithered image element) having a size identical to that of the elementary shape image. For instance, a result of a logical AND operation performed based on the color pallet data item CP1 between the elementary shape image SG1 and a dither mask having a gradation value "0" corresponding to the gradation value "0" of the color C, a C-color pseudo-gradation image (C-color dithered image element) of the elementary shape image SG1 is produced. Similarly, as a result of logical AND operations performed based on the color pallet data item CP1 between the elementary shape image SG1 and dither masks each having a gradation value "4" corresponding to the gradation value "4" of each of the colors M and Y, an M-color dithered image element and a Y-color dithered image element of the elementary shape image SG1 are produced. Then, if the C-color, M-color, and Y-color dithered image elements of the elementary shape image SG1 are printed, a color pseudo-gradation image of the image element corresponding to the elementary shape image SG1 and the color pallet data item CP1 is eventually printed.

Similarly, by dithering the elementary shape images SG2 and SG3 respectively based on the color pallet data items CP2 and CP3, it is possible to form color-by-color dithered image elements, i.e. C-color, M-color, and Y-color dithered image elements of an image element corresponding to the elementary shape image SG2 and the color pallet data item CP2 as well as those of one corresponding to the elementary shape image SG3 and the color pallet data item CP3. Then, if the dithered image elements of each of the image elements are printed, color pseudo-gradation images of the respective image elements are eventually printed.

Actually, in the printer block 12, synthesized dithered image elements are produced on an ink-by-ink basis. More specifically, there are produced a C-color synthesized dithered image of a synthesized image (corresponding to FIG. 6A in the present embodiment), formed by synthesizing the C-color dithered image elements of the elementary shape images SG1, SG2, and SG3, a M-color synthesized dithered image formed by synthesizing the M-color dithered image elements of the same, and a Y-color synthesized dithered image formed by synthesizing the Y-color dithered image elements of the same. Further, a synthesized dithered image of K color (mixture of the three primary colors C, M, and Y), which has a gradation value of a black color shown in a left group of columns in the FIG. 7 table, is produced from the C-color, M-color, and Y-color synthesized dithered images of the synthesized image (or alternatively, produced from the dithered images before synthesis thereof), and then the synthesized dithered images of C color, M color, and Y color (see columns of C2, M2, Y2 in the FIG. 7 table) are modified by extracting the k-color portions therefrom. Thereafter, the C-color, M-color, Y-color, and K-color synthesized dithered images are printed on an ink-by-ink basis whereby a color synthesized image is eventually printed.

As described above, the printer block 12 is capable of printing a print image (output image) equivalent to a color image with 256 gradation levels. For printing of the print image, print image data representative of the print image is prepared as color image data. In the following, whatever dither method is employed for dithering, both elementary shape image data and color pallet data are simply referred to as "image element data". Further, "an x image represented by x image data" is simply referred to as "an x image", unless otherwise specified. Therefore, it is possible to make such description as "the printer block 12 is capable of synthesizing the three image elements (i.e. the image element SG1 whose color is specified as a red color, the image element SG2 whose color is specified as a blue color, and the image element SG3 whose color is specified as a light gray color) shown in FIG. 6B, and printing the synthesized image as a print image PGa which can be recognized by colors, as shown in FIG. 6A".

It should be noted that the image elements in FIG. 6A are shown in a dot-shaded manner, and contour lines thereof by imaginary lines (dotted lines) for ease of discerning the image elements which can be shown in the figure only as monochrome images. The print image PGa could not be identified as a no-smoking mark without the imaginary lines, similarly to a monochrome image referred to hereinafter (see FIG. 8A). Further, a relatively simple figure, such as a "no-smoking mark", was used as the figure described above with reference to FIG. 6A, due to limited space of the drawing sheet (for purposes of efficiency of illustration and description), but however complicated a plotted image is, if it is regarded as a synthesized image formed by synthesizing image elements in each of which at least all the pixels of elementary object images thereof have an identical gradation value, the plotted image can be decomposed into image elements. Further, each image element can be decomposed into an elementary object image and an elementary background image other than the elementary object image, and the elementary object image and the elementary background image can be distinguished from each other. Therefore, by producing dithered image elements corresponding to respective image elements and combining them (superimposing corresponding matrix elements), it is also possible to obtain a dithered image element formed by carrying out the dithering on a complicated plotted image.

Next, the display (display means, second image-outputting device) 4 will be described. The tape printing apparatus 1 is basically a printer, as described hereinbefore, whose performance is evaluated based on results of printing, so that the printer block 12 of the apparatus 1 is capable of printing a print image equivalent to a color image with 256 gradation levels. However, as far as the display 4 is concerned, since it is not directly related to such performance evaluation, priority is given to reduction of the size and price of the tape printing apparatus 1. More specifically, even if a color image with 256 gradation levels is output to the display 4, the display 4 can only display (output) it as a monochrome image for display of layout of a print image.

As described hereinbefore, the keyboard 3 has the image key, not shown, for alternately switching between the text entry screen or the selection screen and the display screen (image screen) for displaying print image data. Accordingly, when the user depresses the image key in a state of the text entry screen or the selection screen being displayed on the display screen 40, the display 4 switches the displayed screen to the image screen. That is, by carrying out this operation, the user can check a layout of a print image to be printed on a tape T, on the display screen 40 of the display 4. Therefore, to this end, and particularly to allow the user to check a layout when a plurality of different print images are to be printed simultaneously, it is required to display the print images such that each of the print images can be discerned and the plurality of print images can be distinguished from each other.

However, as described above, the printer block 12 is capable of printing a color image with 256 gradation levels as a print image, whereas the display 4 can only display (output) a monochrome image for display of layout of the color image. That is, if a print image having a plurality of colors is displayed as a monochrome image without further processing, e.g. when gradation values of the plurality of colors are dealt with as an identical gradation value in the monochromatic display (e.g. in the example described above with reference to FIGS. 6A to 6C, if the maximum value or the average value of the gradation values of the respective basic colors are adopted as gradation values for use in displaying the monochrome image, the red-color image element SG1 and the blue-color image element SG2 are output at an identical gradation level), the boundary dividing between the image elements of the print image which are originally distinguished from each other by their colors cannot be discerned, which makes it impossible to identify the print image and its layout on the image screen.

For instance, if the print image PGa described hereinbefore with reference to FIG. 6A is monochromatically displayed without further processing, i.e. if it is displayed (output) as a monochrome image (which will be explained simply as a black and white image hereinafter), a display image DGa shown in FIG. 8A is presented on the image screen, so that it is impossible to identify the display image as the print image PGa. In this example, since the color of an image of a cigarette is white (the gradation values of the respective colors C, M, Y, and K are "0" (see No. 2 in FIG. 7)), and the color of smoke is light gray (the gradation values of the respective colors C, M, Y, and K are "1" (see CP3 in FIG. 6C and No. 5 in FIG. 7)), the portions representing the cigarette and the smoke can be discerned. However, if other colors which are displayed at an identical gradation level in a monochrome display image were designated for the portions, the display image DGa would be displayed as a sheer black circle. If there is any other synthesized image of a figure which is displayed as a black circle in the monochromatic display, the display image DGa cannot be distinguished from the figure. Further, since the image elements cannot be discriminated, even if a layout of the print image is displayed before the image elements are printed simultaneously, the layout cannot be recognized. In the following, an image processing method will be described which is employed in the tape printing apparatus 1 so as to solve the above problem.

In general, e.g. in the case of a color image to be output for display or printing being a unicolored one, even though the unicolor (single color) is different from any color for monochromatic output, it is possible to output the color image as a monochrome image by converting the single color to a color having a gradation value for monochromatic output, based on gradation values indicative of shading (lightness or darkness) of the respective basic colors composing the single color (e.g. by employing the maximum value or average value of the gradation values of the basic colors). Therefore, even in the case of an output image having a plurality of colors, if the image is regarded as a synthesized image formed by synthesizing unicolor image elements, and the unicolor image elements are output separately on an element-by-element basis, it is possible to output the image elements as monochrome images such that they are recognizable. For instance, the above FIG. 6A print image PGa can be regarded as a synthesized image formed by synthesizing the unicolor image elements SG1, SG2, and SG3. Therefore, by outputting the respective unicolor image elements SG1, SG2, and SG3 separately, it is possible to display each of them as a monochrome image as a recognizable image, as shown in FIG. 8B.

If a color which will form a monochrome image having a light gray tone is designated for the background in the example of FIGS. 6A and 6B in place of a white color designated in the example (see FIGS. 9A and 9B: in this case, an image element SG4 is additionally formed), the boundary dividing between image elements SG1 and SG2 of the print image which are originally distinguished from each other by their colors cannot be discerned either as illustrated by a display image DGb shown in FIG. 9A, which makes it impossible to recognize or identify the print image and its layout on the image screen. Also in this case, however, if the image DGb is regarded as a synthesized image formed by synthesizing the unicolor image elements SG1, SG2, SG3, and SG4, and the unicolor image elements are output separately, it is possible to display each of them as a monochrome image in a recognizable state, as shown in FIG. 9B.

Further, if a color which will form a monochrome image having the same gray tone as that of monochrome images of other image elements is designated for the background (see FIGS. 10A and 10B: in this case, an image element SG5 is additionally formed), the boundaries dividing between the image elements SG1, SG2, and SG5 which are originally distinguished from each other by their colors cannot be discerned as illustrated by a display image DGc shown in FIG. 10A, which is presented as a figure close to a mere black square, so that it is impossible to recognize or identify the print image and its layout on the image screen. FIGS. 11A and 11B illustrate an example in which the same color as that of the image element SG2 in the FIG. 6B and FIG. 8B examples is designated as a background color and hence an image element SG6 is formed in place of the image element SG2. Also in this case, as illustrated by a display image DGd shown in FIG. 11A (and similarly to FIG. 10A), the boundaries dividing between the image elements SG1 and SG6 which are originally distinguished from each other by their colors cannot be discerned, so that the display image DGd is presented as a figure close to a mere black square, which makes it impossible to recognize or identify the print image and its layout on the image screen. However, if unicolor image elements SG1, SG3, and SG6 are separately displayed on an image element-by-image element basis, it is also possible to output or display each of them as a recognizable monochrome image, as shown in FIG. 11B.

Therefore, the tape printing apparatus 1 stores one or more synthesized images as candidates for a print image (output image or synthesized image) to be output by the printer block (first image-outputting device) 12 that outputs a synthesized image formed by synthesizing a plurality of image elements, such that the output synthesized image is recognizable. Each of the synthesized images is stored in a state decomposed into a plurality of image elements including a predetermined one which can symbolize the synthesized image as a representative image, and the display (second image-outputting device) 4 that outputs image elements such that they are recognizable only when each of the image elements is output separately is caused to output the representative image of the plurality of image elements of the synthesized image in place of the synthesized image itself. For instance, as shown in FIG. 12, when the FIG. 6A print image PGa is to be printed as "NO-SMOKING MARK 1", the image elements SG1, SG2, and SG3 of the print image PGa are stored in advance as the image elements of a candidate for the print image (output image), and the image element SG2 is selected out of the plurality of image elements (three image elements in this example) SG1, SG2, and SG3 as a representative image (representative display image) TGa and displayed on the image screen instead of displaying a display image of the synthesized image (hereinafter referred to as the "synthesized display image") DGa (see FIG. 8) directly.

That is, the tape printing apparatus 1 allows the display 4 to display the image element SG2 as the representative image (representative display image) TGa representative of the synthesized image (synthesized display image DGa or print image PGa) in place of the synthesized image itself (which the display 4 is not capable of displaying as a recognizable image), whereby the best possible use can be made of the display 4 which can display each of the image elements SG1, SG2, and SG3 as a recognizable image only by outputting the same separately. In this case, since the representative image TGa is predetermined as an image representative of the print image (synthesized image) PGa (see FIG. 6A), the user can understand simply by viewing the representative image TGa displayed on the display screen that it is displayed in place of the print image PGa (or the synthesized display image DGa of the same) to be checked, and thereby confirm that the printer block (first image-outputting device) 12 will output the desired output (print) image PGa.

Similarly, when another print image, such as the print image PGb described above with reference to FIGS. 10A and 10B, or the print image PGc described above with reference to 11A and 11B is to be printed as the "NO-SMOKING MARK 1", the tape printing apparatus 1 causes the display 4 to display the image element SG2 representative of the synthesized (display) image DGb or DGc as a respective representative (display) image TGb or TGc, whereby the user can understand simply by viewing the representative image TGb or TGc displayed on the display screen that it is displayed in place of the respective print image PGb or PGc (or the synthesized display image DGb or DGc of the same) to be checked, and thereby confirm that the printer block 12 will surely output the desired print image PGb or PGc.

In the tape printing apparatus 1, a plurality of image elements of each synthesized image are stored with an image element selected as a representative image at the head of a sequence of the image elements. For instance, in the case of the image elements of the print image PGa described above, the image element SG2 selected as the representative image TGa in FIG. 13A is stored foremost and then the image elements SG1 and SG3 are stored in the mentioned order, as shown in FIGS. 13A and 13B. As a result, for output to the printer block 12, the image elements SG2, SG1, and SG3 can be sequentially read out in the order in which they are stored, while for output to the display 4, only the representative image TGa can be read out so that the user can easily confirm that the output image to be printed is the print image PGa.

Figure 14A:
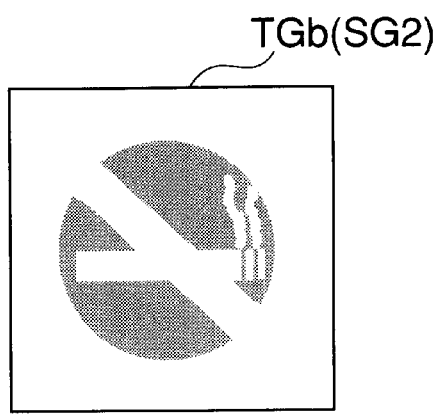
FIGS. 14A and 14B are diagrams similar to FIGS. 13A and 13B, which illustrates a case of another synthesized image being stored as the image No. 1 in FIG. 12.
Figure 14B:
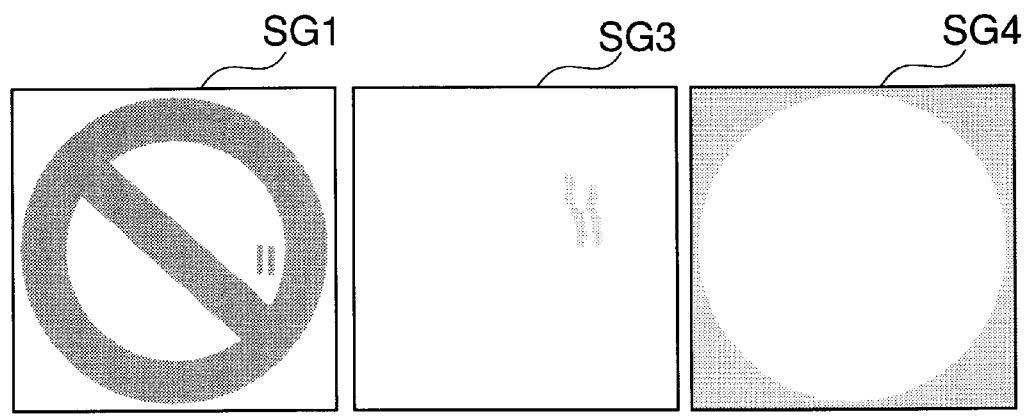

Similarly, when the print images PGb and PGc are to be printed as the "NO-SMOKING MARK 1", i.e. when synthesized images therefor are to be stored as candidates for a print image, as shown in FIGS. 14A and 14B and FIGS. 15A and 15B, the representative image TGb in FIG. 14A and the representative image TGc in 15A are stored foremost and then the other image elements in FIGS. 14B and 15B are stored in a manner following the respective representative images TGb and TGc in the orders shown in the figures. For output to the printer block 12, the image elements of a selected one of the synthesized images are sequentially read out in the above-mentioned order, while for output to the display 4, the image element (representative image) of the selected synthesized image in FIG. 14A or 15B (i.e. stored at the head of the sequence of the stored image elements) alone is read out so that the user can easily identify the output image.

The tape printing apparatus 1 stores a plurality of different synthesized images, such as Images No. 1 to No. 5 shown in FIG. 12, as candidates for a print image to be selected for printing. A representative image of an arbitrary one of the synthesized images is required to be an image element which is characteristic of the arbitrary one of the synthesized images, and not included in the image elements of the other synthesized images. For instance, only a selected one of the synthesized images PGa to PGc is stored for the image No. 1 "NO-SMOKING MARK 1". Further, out of the image elements of the selected synthesized image, one which does not belong to any other synthesized image listed below in FIG. 12 is selected as a representative image. In other words, the representative image of the selected synthesized image is limited to an image element which is characteristic of the selected synthesized image.

Further, in the case of printing the image No. 2 "NO-SMOKING MARK 2", for instance, a FIG. 16A representative image TGd (image element SG6) is stored at the head of a sequence and the FIG. 16B image elements SG1 and SG2 are stored at the following positions of the sequence in the mentioned order. For output to the printer block 12, the image elements SG1, SG1 and SG3 are sequentially read out in the same order, while for display on the display 4, the representative image TGd alone is read out. By viewing the representative image TGd displayed, the user can understand that it is displayed in place of the synthesized image PGd (synthesized display image DGd) to be checked, and thereby confirm that the output image to be output by the printer block 12 is the desired synthesized image PGd. In this case, the representative image TGd is an image element which is not included in any other synthesized image, i.e. an image element characteristic of the synthesized image PGd.

The representative image TGd (image element SG6) selected for the above synthesized image PGd represents the general view of the whole of the synthesized image PGd. That is, an image element, such as the image element SG6, which represents the general view of the whole of a corresponding synthesized image can be selected as a representative image representative of the synthesize image.

In the case of the following image No. 3 "AUTUMN MOON" in FIG. 12, the general view of the whole image is represented better by an image element SG10 representative of a whole background of the synthesized image "AUTUMN MOON" than by the other image elements SG11 and SG12, as shown in FIGS. 17A and 17B. Therefore, in this example, the FIG. 17A representative image TGh (image element SG10) and the FIG. 17B image elements SG11 and SG12 are stored in a sequence in the mentioned order. Then, for output to the printer block 12, the image elements SG10, SG11 and SG12 are sequentially read out in the same order, while for display on the display 4, the representative image TGh alone is read out. By viewing the representative image TGh displayed, the user can understand that it is displayed in place of a synthesized image PGh (synthesized display image DGe) to be checked, and thereby confirm that an output image to be output by the printer block 12 is the desired synthesized image PGh. In this example, the image element SG12 may be selected as a representative image TGi so as to lay emphasis on the "MOON" in the synthesized image PGh entitled "AUTUMN MOON". Further, when the synthesized image PGh is entitled "AUTUMN GRASS" such as the image No. 4 in FIG. 12, the image element SG11 representative of the grass may be selected as a representative image TGj.

Similarly, in the case of the following image No. 5 "SNOWMAN" in FIG. 12, the general view of the whole image is represented better by a image element SG13 in FIG. 18 representative of a whole background of the synthesized image "SNOWMAN" than by image elements SG14 to SG19 in FIG. 19. Therefore, in this example, the FIG. 18 representative image TGk (image element SG13) and the FIG. 19 image elements SG14 to SG19 are stored in a sequence in the mentioned order. Then, for output to the printer block 12, the FIG. 18 image element SG13 and the FIG. 19 image elements SG14 to SG19 are sequentially read out in the same order, while for display on the display 4, the foremost FIG. 18 representative image TGk alone is read out. By viewing the representative image TGk displayed, the user can understand that it is displayed in place of a synthesized image PGk (synthesized display image DGk) to be checked, and thereby confirm that an output image to be output by the printer block 12 is the desired synthesized image PGk. It should be noted that if there is provided another synthesized image of "SNOWMAN" with a different expression or the like from that of the "SNOWMAN" of the synthesized image PGk, the image element SG14 may be selected as a representative image TGl so as to lay emphasis on the expression or the like of the "SNOWMAN" of the synthesized image PGk. Further, if necessary, any other image element in FIG. 19 may be selected as a representative image as required.

As described above, in the tape printing apparatus 1, a synthesized image as a candidate for an output image is a color image, and the synthesized image is formed by a plurality of unicolor image elements whose colors are different from each other. More specifically, by regarding an output image having a plurality of colors as a synthesized image formed by synthesizing a plurality of unicolor image elements, and outputting unicolor image elements separately to the output device, even the output means of the apparatus 1 which is capable of outputting only unicolored images can output image elements such that they are recognizable in their individual separately output state. Still more specifically, even if a print image to be output by the printer block (first image-outputting device) 12 is a color image with a plurality of colors, a representative image which is one of the image elements of the print image is a unicolor image, so that it is possible to output the representative image to the display (second image-outputting device) 4 which is capable of outputting unicolor image elements whose colors are different from each other as respective recognizable images only by outputting them separately on an image-by-image basis, such that the display 4 can output the representative image as a recognizable image. Thus, the user can check by the use of the display 4 whether the output image to be output by the printer block 12 is a desired output image.

In this case, so long as the display 4 is capable of handling a monochrome image having any gray tone, it is possible to output each unicolor image element as a monochrome image even if the image element does not correspond to the monochrome image in color or gray tone, as described hereinbefore. Therefore, it is not required to handle any color images, which contributes to speeding-up of processing by the apparatus 1 and reduction of manufacturing costs of the same. In an extreme statement, the display 4 is only required to be capable of handling two gradation values indicative of validity/invalidity of each pixel of the respective image elements. Further, the display (second image-outputting device) 4 is a display device for displaying an image as an output image on a display screen. That is, by outputting a representative image out of a plurality of image elements of a synthesized image to the second image-outputting device as the display device in place of the synthesized image, it is possible to easily confirm that an image to be output by the printer block (first image-outputting device) 12 is a desired image. In handling the two gradation values indicative of validity/invalidity of each pixel, determination as to each pixel can be performed based on only two values, and hence this processing based on the two gradation values is particularly suitable for a case in which the layout of a whole image is required to be displayed on a reduced scale or a case in which a display screen is small.

Although in the above embodiment, description was made by taking a case of displaying a color print image as a monochrome display image as an example, similar processing is carried out in the case of displaying a monochrome print image having multiple gradation values as a monochrome display image having a smaller number or limited range of gradation values. In this case, similarly to the color print image described above, the monochrome image having multiple gradation values is regarded as a synthesized image formed by synthesizing a plurality of image elements whose gradation values are different from each other, and decomposed into the image elements. By outputting an image element separately to an image-outputting device which is capable of only outputting a monochrome image having a small number or limited range of gradation values as a recognizable image, according to the smaller number or limited range of gradation values, even the image-outputting device can output the image element as a recognizable image. More specifically, even if a print image to be output by the printer block (first image-outputting device) 12 is a monochrome image having multiple gradation values, a representative image which is one of the image elements of the print image is an image having a smaller number or limited range of gradation values, so that it is possible to output the representative image to the display (second image-outputting device) 4 which is capable of only outputting a monochrome image having a smaller number or limited range of gradation values, such that the display 4 outputs the representative image as a recognizable image. Thus, the user can check by using the display 4 whether the output image to be output by the printer block 12 is a desired output image. Also in this case, the display 4 is only required to be capable of handling two gradation values indicative of validity/invalidity of each pixel of the respective image elements. Therefore, the display 4 is not required to handle multiple gradation values, which contributes to speeding-up of processing by the apparatus 1 and reduction of manufacturing costs of the same.

Further, although in the above embodiment, the second image-outputting device is formed by display means (display 4), it may be formed by printing means. In this case, the second image-outputting device is suitable for tentative printing which enables the user to check the layout of a synthesized image not by printing the synthesized image itself but by printing a representative image which is identical in size to the synthesized image. Further, even if the synthesized image is a color image or a monochrome image having multiple gradation values, it is possible to handle the synthesized image similarly to a unicolor image or a image having a smaller number or limited range of gradation values, which contributes to speeding-up of processing by the apparatus 1 and reduction of manufacturing costs of the same. Moreover, although the printing means in the apparatus 1 is defined as the first image-outputting device, and the display means as the second image-outputting device, these output devices maybe formed by any other device or means capable of outputting an image. Further, the first and second image-outputting devices are not required to be provided in an identical image processing device.

More specifically, so long as whether an output image to be output by the first image-outputting device that outputs a synthesized image formed by synthesizing a plurality of image elements as a recognizable image is a desired output image can be checked by using the second image-outputting device that outputs any of the image elements as a recognizable image only when it is output separately, these image-outputting device may be formed by any suitable devices, such as a printing apparatus and a display device, both of which may be of a general type. Further, the invention can be applied to image processing for forming images for any possible purposes.

By the way, it is regrettable to say that there can be cases where there is no suitable image element which can symbolize a synthesized image. That is, in the above embodiment (first embodiment), in place of the synthesized image, an image element which can symbolize the synthesized image is output by the second image-outputting device, whereby it can be easily checked, by using the second image-outputting device which is capable of outputting each of a plurality of image elements as a recognizable image only by outputting it separately, whether or not an image to be output by the first image-outputting device as the synthesized image formed by synthesizing the plurality of image elements is a desired image. However, there can be a case where there is no suitable image element which is representative of the synthesized image.

Figure 21A:
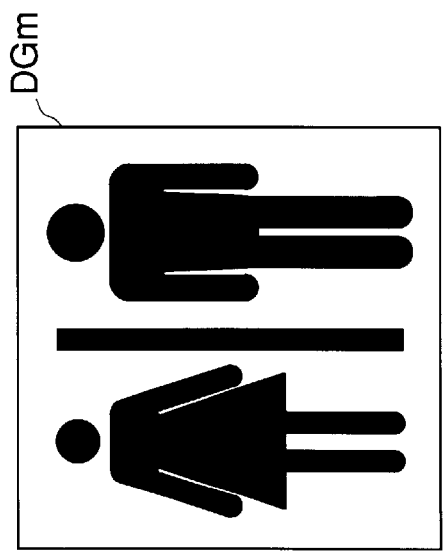
FIGS. 21A and 21B are diagrams which are useful in explaining images to be stored by a conventional method, with reference to FIG. 20.
Figure 21B:
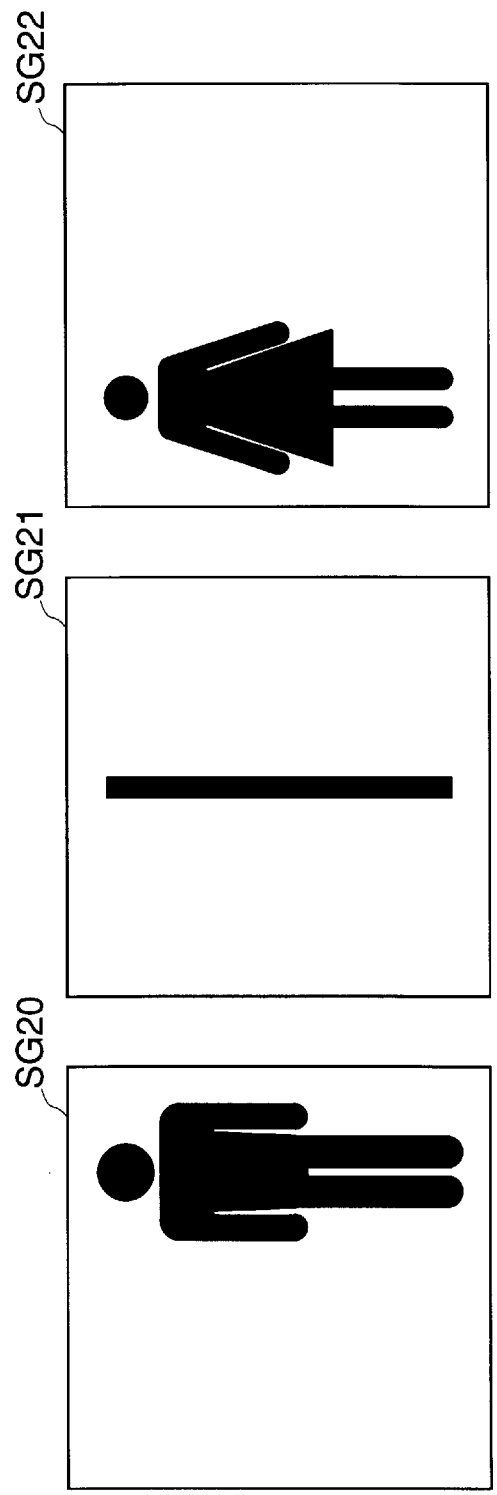

For instance, if the synthesized image PGm is a figure of "LAVATORY MARK" as shown in FIG. 20, as shown in FIG. 21B, a synthesized image is formed by synthesizing three image elements SG20 to SG22: an image element (image of a male person, hereinafter referred to as "the male mark image element") SG20, which is designated to be a blue color by color palette data CP20, an image element (partition image, hereinafter referred to as "partition mark image element") SG21, which is designated to be a black color by color palette data CP21, and an image element (image of a female person, hereinafter referred to as the "the female mark image element") SG22, which is designated to be a red color by color palette data CP22. However, in this case, none of the male mark image element, the partition mark image element, and the male mark image element are suitable for the representative image. That is, none of them can be a representative image which symbolizes the synthesized image PGm.

In the illustrated example, even if the synthesized image PGm is directly output to the second image-outputting device similarly to the prior art, boundaries dividing between the image elements can be recognized. However, originally, it is desired to check on an image to be output by the first image-outputting device as quickly as possible, by causing the second image-outputting device to output the representative image. That is, when the checked image is not the desired image to be output by the first image-outputting device, it is required to look for the desired image or modify or edit the image in some cases, and hence it is preferable that the time for checking is made as short as possible.

In contrast, the second image-outputting device assumed to be employed in the apparatus is in most cases inferior in capability and performance than the first image-outputting device, due to the requirement of reduction of the size and costs of the apparatus, so that if the second image-outputting device carries out the same processing (image-synthesizing process) as carried out by the first image-outputting device, it cannot meet the requirement of confirmation or checking effected as promptly as possible. That is, to output the synthesized image as it is by the second image-forming means similarly to the conventional method, the same processing as carried out by the first image-synthesizing process is required. In this case, the second image-outputting device which is inferior in the capability and performance cannot meet the requirement of confirmation or checking effected as promptly as possible.

For instance, when the first image-outputting device is printing means which is capable of performing color printing (that is, the synthesized image is a print image), if it takes more time to provisionally print a monochrome image representative of the synthesized image by using the second image-outputting device which is capable of printing only monochrome images than to directly print the synthesized image by using the first image-outputting device, it is no use to carry out the provisional printing even though there is a merit of reducing the cost of ink and paper (running costs). Similarly, when the first image-outputting device is display means which is capable of performing color display (that is, the synthesized image is a display image), if it takes more time to carry out the provisional display by the second image-outputting device (display means) than by the first image-outputting device, it is nonsense.

Further, in a most general form, if the first image-outputting device is printing means capable of printing a color image(that is, the synthesized image is a print image), and the second image-outputting device is display means capable of displaying only a monochrome image, the merits of checking on whether a synthesized image to be output is a desired print image include not only reduction of waste of printing paper, but also the capability of immediacy of checking, including the capability of quickly finding a desired synthesized image, and that of quickly checking on results of the modification and editing. Further, usually, it takes much time for a printing mechanism to operate to print a synthesized image and hence the time for processing the synthesized image is almost negligible. However, if the image cannot be displayed quickly (that is, it take much time to check on the image by using the second image-outputting device), it is a great inconvenience from the view point of user friendliness.

On the other hand, if separately from i.e. additionally to a synthesized image to be output by the first image-outputting device, a dedicated image to be output exclusively by the second image-outputting device is prepared, the above inconvenience of delay of processing (image-synthesizing time) can be eliminated. However, operation (processing) for preparing the dedicated image is required and an extra capacity of memory for storing such dedicated images is required. For instance, in the case of the illustrated example in FIG. 20, if separately from the three image elements SG20 to SG22 of the synthesized image PGm to be output by the first image-outputting device, data of a dedicated image DGm (FIG. 21A) to be input to the second image-outputting device is prepared, it is only required to input the dedicated image to the second image-outputting device to output the same by using the second image-outputting device. Although this eliminates the inconvenience of delay of processing of the synthesized image, operation (processing) for preparing the dedicated image DGm and an extra capacity of memory for storing such dedicated images are necessary.

Now, an image-forming method according to a second embodiment of the invention will be described which makes it possible to easily check on whether a synthesized image to be output by the first image-outputting device is a desired image, by using the second image-outputting device capable of outputting each of image elements of the synthesized image as a recognizable image only when it is output separately, without accompanying extra processing time or an increase in the capacity of memory, only for checking on the synthesized image, even when there is no image element suitable for a representative image which symbolizes the synthesized image. For purposes of ease of understanding, similarly to the first embodiment, the first image outputting device is implemented by the printing means (printer block 12) of the tape printing apparatus 1, which is capable of printing color images, and the second image-outputting device is implemented by the display means (display 4) of the same, which is capable of displaying only monochrome images.

In the tape printing apparatus 1 according to the second embodiment, basically, to check on whether a synthesized image of n image elements (n is an integer equal to or larger than 2) to be output by the first image-outputting device capable of outputting the synthesized image is a desired image, in place of the synthesized image, a substitute image corresponding thereto and equivalent to each of the image elements is caused to be output by the second image-outputting device. That is, instead of causing the first image-outputting device to output the synthesized image as a candidate for a desired output image, the substitute image corresponding thereto is caused to be output by the second image-outputting device, whereby it is possible to check on whether the synthesized image is an image desired to be output by the first image-outputting device.

An image-processing method employed by the second embodiment includes the image-processing method employed by the first embodiment described hereinbefore. That is, when n image elements of a synthesized image include a representative image which symbolizes the synthesized image, the substitute image is made identical to the representative image. In this case, the image processing method of the second embodiment is similar to that described above. For instance, when a synthesized image to be output to the printer block (first image-outputting device) 12 is the print image PGa shown in FIG. 6, the image element SG2 which symbolizes the print image (synthesized image) PGa is set to the representative image PGa, and in place of the print image PGa, the representative image PGa which symbolizes the printing image PGa is set to the substitute image, which is caused to be output by the display (second image-outputting device) 4. In this case, even when the display 4 which is capable of outputting only separately each of image elements as a recognizable image (though incapable of outputting the synthesized image PGa as a recognizable image), the representative image TGa can be output as a recognizable image. Further, in this case, the substitute image (representative image) TGa symbolizes the synthesized image PGa, and hence by viewing the output substitute image TGa, it is possible to understand that the substitute image TGa is representative of the synthesized image to be checked on or confirmed, so that it is possible to confirm that the image to be output by the printer block (first image-outputting device) 12 is the desired image.

Since the substitute image is identical to the representative image TGa (i.e. the image element SG2), it is not required to store the same in a duplicating manner, but as described hereinbefore with reference to FIG. 13, m (=n; in this case, m=n=3) stored image elements (image elements SG1 to SG3) at the maximum are only required to be stored, and compared with the conventional method which stores a total of n+1 (=4) images consisting of the substitute image and n (=3) image elements, only the m (=3) image elements are stored as the stored image elements. Therefore, the capacity of memory can be saved by at least an amount corresponding to n−m+1 (=1) image element. Further, similarly to this case, if m=n (=3) holds, all the n (=3) image elements including the substitute image (representative image: image element SG2) are stored, so that by synthesizing them, the synthesized image (print image) PGa can be caused to be output by the first image-outputting means (printer block) 12. This is also the case with the other examples referred to in the description of the first embodiment, and the same effects can be obtained, redundant description of which is omitted here.

Figure 22A:
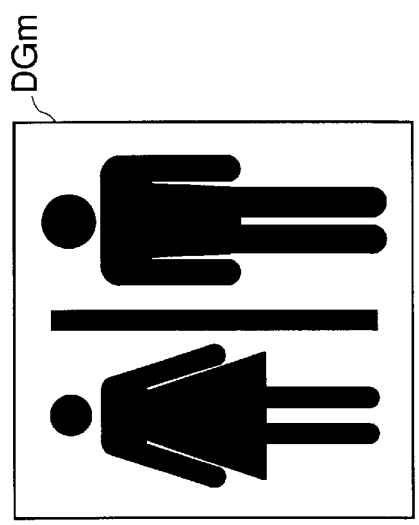
FIGS. 22A and 22B are diagrams which are useful in explaining stored image elements of the image processing method according to a second embodiment of the invention.
Figure 22B:
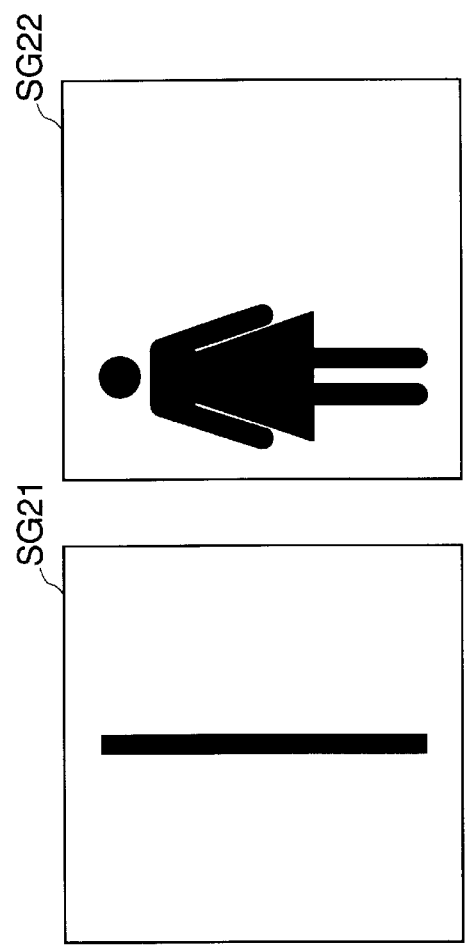

On the other hand, if there is no image element which suitably symbolizes the synthesized image, in the tape printing apparatus 1 according to the second embodiment, first, m−1 (m is an integer defined as 2≦m≦n) and a substitute image are stored as m stored image elements corresponding to the synthesized image. For instance, assuming that the synthesized image PGm to be output by the printer block (first image-outputting device) 12 is the "LAVATORY MARK" described above with reference to FIG. 20, compared with the conventional method in which n+1 (=4) images consisting of the image elements SG20 to SG22 are stored as described hereinabove with reference to FIG. 21, in the present embodiment, as shown in FIG. 22, m−1 of the n (=3) image elements (m is an integer defined as 2≦m≦n, in this example, n=3), and the substitute image DGm are stored as m (=3) stored image elements corresponding to the print image (synthesized image) PGm. That is, in this case, only them (=3) of the image elements are stored, the capacity of memory can be saved by an amount corresponding to n−m+1 (=1) image element compared with the conventional method which stores n+1 (=4) image elements.

Further, in this case, next, instead of causing the printer block (first image-outputting device) 12 to output the synthesized image (print image) as a candidate for a desired output image, by causing the display (second image-outputting device) 4 to display the substitute image (display image) DGm, it is possible to check on whether the print image PGm is an image desired to be output by the printer block 12. In this case, the substitute image DGm can be output as it is, no extra processing time is required for image processing.

Figure 23:
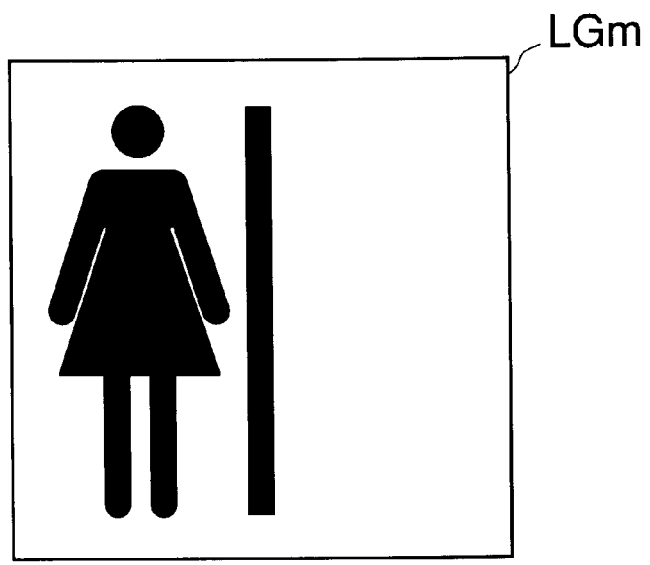
FIG. 23 is a diagram showing an example of an image formed at an intermediate step in the process of logical operations.
Figure 24:
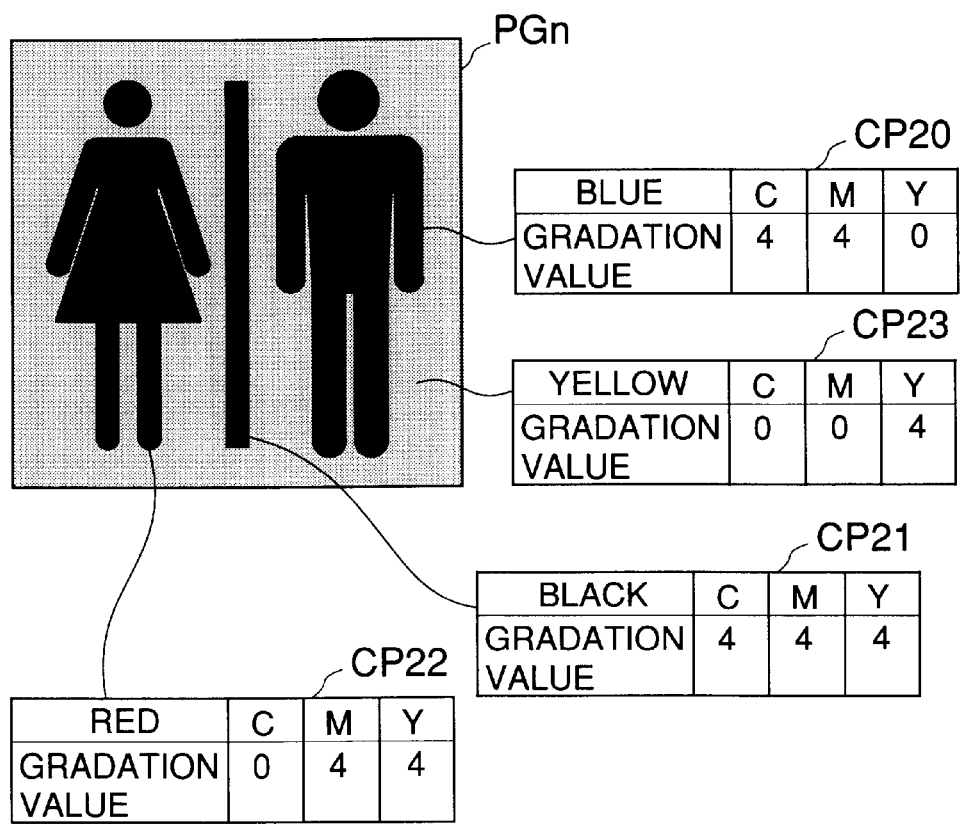
FIG. 24 shows still another example of a synthesized image as a print image, which has an image element which can be suitably used as a representative image symbolizing the synthesized image.

Further, the substitute image is an image which permits the remaining n−m+1 image element(s) to be generated by carrying out logical operation between the same and at least one of the m−1 image elements stored as stored image elements. The logical operation in the present embodiment is intended to mean a logical operation between corresponding matrix elements of matrices representative of respective ones of the image elements, and is of the same kind carried out for the dithering. For instance, in the FIG. 22 case, the substitute image DGm permits the n−m+1 (=1) image element SG20 (see FIG. 21) to be generated by carrying out logical operation between the same and the m−1 (=2) image elements SG21 and SG22 stored as the stored image elements. That is, by deleting the valid pixels of the partition mark image element SG21 and the female mark image element SG22 from the substitute image DGm, the male mark image element SG20 can be obtained. The logical operation for this purpose is carried out, assuming that each valid pixel is "1", by the logical OR operation between the image element SG21 and the image element SG22 to obtain the image LGm as shown in FIG. 23, and by the logical AND operation between an inverted image of the image LGm and the substitute image DGm.

Of course, the deletion of images from the substitute image DGm can be carried out separately and sequentially, e.g. by first deleting the image element SG21, and then deleting the image element SG22. As another alternative, instead of carrying out inversion of the image LGm and then carrying out the logical AND operation between the inverted image of the image LGm and the substitute image DGm, an exclusive-OR operation between the image LGm and the substitute image DGm can be carried out. Thus, the generation of the remaining image elements which are not stored can be carried out by general logical operations, as desired. Further, in the FIG. 22 case, although the storage of the image element SG20 is dispensed with, the same processing can be effected by omitting the storage of another image element (e.g. image element SG21 or SG22).

Then, in these cases, the m−1 (=2) image elements (e.g. the image elements SG21 and SG22 of FIG. 22) are stored as the stored image elements, to cause the printer block (first image-outputting device) 12 to output the print image (synthesized image) PGn, the logical operations are carried out to generate the remaining n−m+1 (=1) image element (SG2 of FIG. 21), and then the (M−1)+(n−m+1)=n (=3) image elements (SG20 to SG22) are synthesized for output as the synthesized image. That is, compared with the conventional method (e.g. as shown in FIG. 21) in which the n+1 (=4) image elements consisting of the substitute image DGm and the n (=3) image elements (SG20 to SG23) are stored, only the m (=3) image elements are stored as the stored image elements to thereby save the capacity of memory, and at the same time, the print image (synthesized image) PGm can be output to the printer block (first image-outputting device) 12 similarly to the case of storing the n+1 (=4) image elements.

Further, since the substitute image DGm is stored as the stored image element, the substitute image PGm can be directly output to the display (second image-outputting device) 4 in place of the print image (synthesized image) to be output by the printer block (first image-outputting device) 12 without requiring no extra processing time e.g. for synthesis of the substitute image PGm, whereby it can be checked on whether or not the print image PGm to be printed by the printer block 12 is a desired image. Therefore, according to the tape printing apparatus 1, it is possible to easily check on whether or not the print image PGm to be printed by the first image-outputting device capable of outputting a synthesized image formed by synthesizing a plurality of image elements as a recognizable image is a desired image, by using the second image-outputting device which is capable of outputting each of the image elements as a recognizable state only when it is output separately.

It should be noted that in this case, if the substitute image is a representative image, the capacity of memory can be saved by an amount corresponding to the amount thereof, and the logical operations described above can be omitted. Now, an example of this will be described in detail hereafter. Let it be assumed that there is a print image (synthesized image) PGn prepared by also assigning a color to the background of the print image (synthesized image) PGm of the "LAVATORY MARK" described above with reference to FIG. 20, and the color is designated to be a yellow color by color palette data CP23 (shown by a dot-shaded portion in the figure since it cannot be perceived in monochrome print).

Figure 25A:
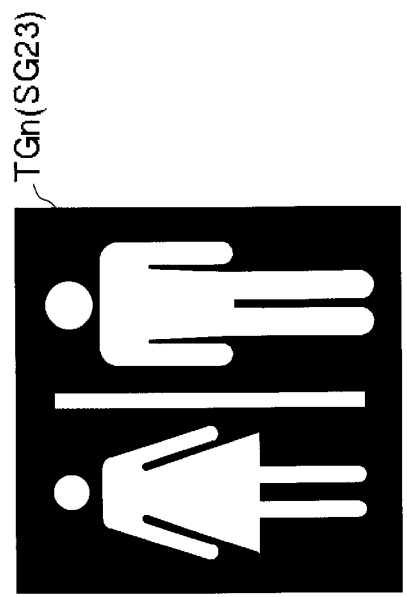
FIGS. 25A and 25B are diagrams which correspond to FIG. 24 and are useful in explaining stored image elements which are to be stored by the image processing method according to the second embodiment.
Figure 25B:
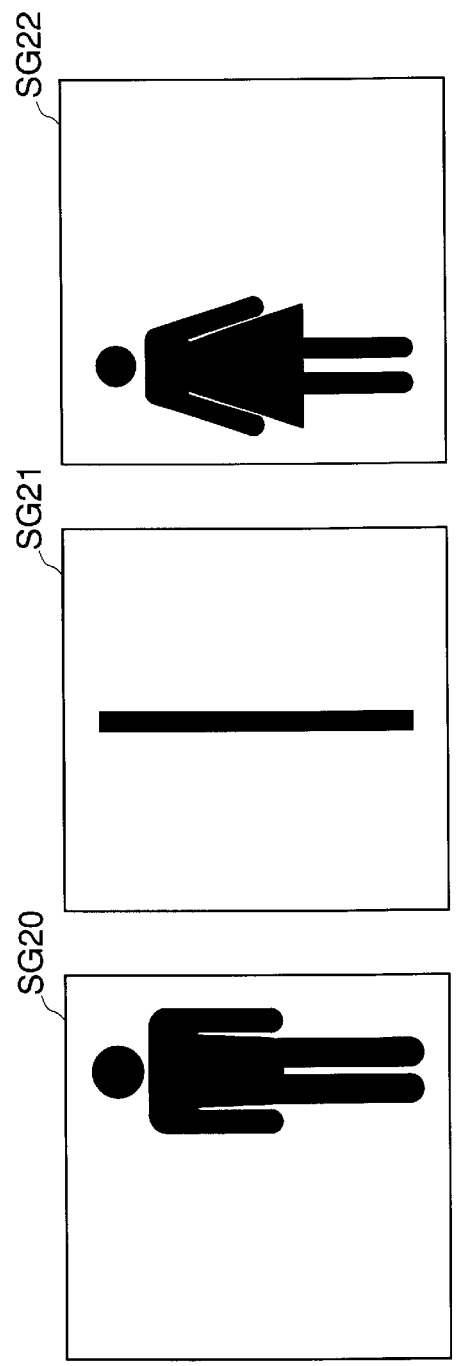

In this case, the total of image elements is equal to four (n=4) through addition of the image element SG23 for the background image of the whole image to the image elements SG20 to SG22. As shown in FIG. 25, the image element SG23 can be a representative image which symbolizes the print image (synthesized image) PGm, and hence it is set to the representative image TGn, and used as the substitute image DGm, it is only required to store m (=n=4) stored image elements (SG20 to SG23). Compared with the conventional method in which n+1 (=5) images consisting of another suitable substitute image and n (=4) image elements, at least n−m+1 (=1) image element can be saved since only the m (=4) image elements are stored. The method of processing carried out for the example shown in FIG. 25 is included in the image processing method of the present embodiment, and similar to that described in the first embodiment, so that the same advantageous effects can be obtained. The examples of the processing in this kind are fully described for the first embodiment, so that description thereof is omitted here, and the foregoing description should be referred to.

Figure 26A:
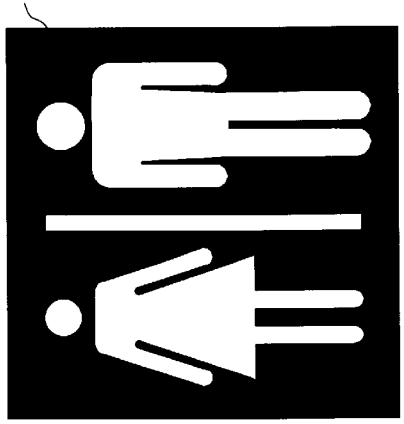
FIGS. 26A and 26B are diagrams which corresponds to FIG. 24 and show an example of stored image elements useful for explaining a manner of application of the image processing method according to the second embodiment, which is different from the manner of application of the method according to the first embodiment.
Figure 26B:
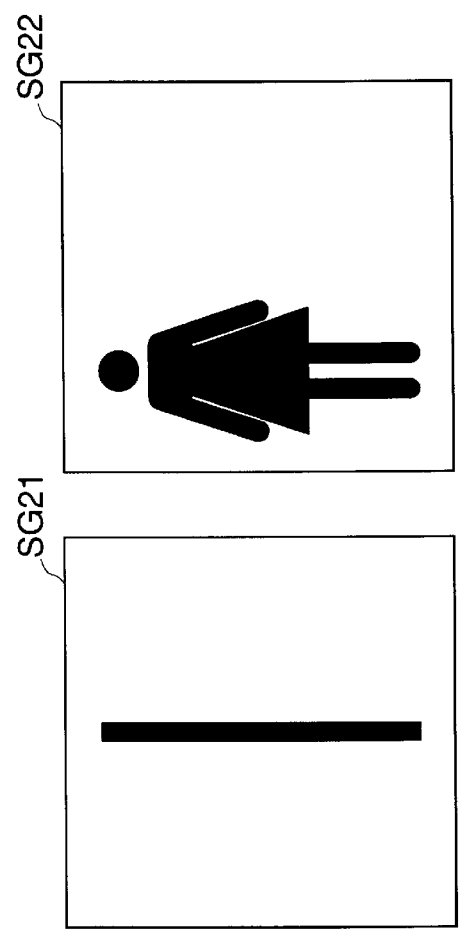

More specifically, here, as shown in FIG. 26, the storage of the male mark image element SG20 is omitted similarly to the case of FIG. 22. That is, conventionally, a suitable substitute image other than the above-mentioned substitute image, and the n (=4) image elements are stored, according to the present embodiment, only the m (=3) image elements are stored as the stored image elements, which makes it possible to save the capacity of memory by an amount corresponding to n−m+1 image elements. Further, in the FIG. 26 example, the substitute image DGn is a representative image TGn which symbolizes the print image (synthesized image) PGn, and at the same time, permits the remaining n−m+1 (=5−3+1=2) image elements to be generated by carrying out the logical operation between the same and each of the m−1 (=2) stored image elements SG21 and SG22.

One of the remaining two is a representative image TGn which is identical to the substitute image DGn, i.e. an image element SG23 which is the representative image TGn, so that the substitute image can be wholly used for the image element SG23. Further, the other of the remaining two is a male mark image element SG20 (see FIG. 25), it can be easily obtained by carrying out the logical operations between the substitute image DGn and the m−1 (=2) image elements (SG21 and SG22). This will not require further explanation since an inverted image of the substitute image DGn (obtained by NOT operation) is the substitute image DGm described hereinabove with reference to FIG. 22. That is, the processing can be carried out by only general logical operations. Further, instead of omitting the storage of the image element SG20, the storage of another image element (SG21 or SG22) may be omitted to obtain the same results.

Further, in this case, since the substitute image DGn is stored as one of the stored image elements, it is possible to directly input data of the substitute image DGn to the display (second image-outputting device) 4 as it is without extra processing time for synthesis and the like, instead of inputting the data of the print image (synthesized image) PGn to the printer block (first image-outputting device) for output of the print image (synthesized image) PGn. Further, the substitute image DGn (representative image TGn: image element SG23) symbolizes the print image PGn, by viewing the output substitute image DGn, it is possible to grasp or discern that the print image PGn is checked on, whereby it is possible to easily check on whether the image to be output by the printer block (first image-outputting device) is a desired image.

Therefore, according to this tape printing apparatus 1, it is possible to easily check on whether or not a print image to be output by the first image-outputting device capable of outputting a synthesized image of a plurality of image elements as a recognizable image is a desired image, by using the second image-outputting device which is capable of outputting each single image of a plurality of image elements as a recognizable image only when it is output separately. It should be noted that the examples of the images based on which the first embodiment is described can be similarly processed by the second embodiment, providing the same advantageous effects. Here, detailed description thereof is considered to be redundant, and hence only main advantages effects will be just enumerated below.

First, by storing the m stored image elements in a sequence with the substitute image at a head of the sequence, when they are output to the first image-outputting device, the synthesis of the image elements can be easily carried out by sequentially reading the m stored image elements, and at the same time, to check on the synthesized image, it is only required to read out the substitute image at the head of the sequence of the stored image elements. Further, as in the case of examples shown in FIGS. 22 and 26 if the substitute image is a stored image element showing a general view of the corresponding synthesized image, it can be used as the substitute image which symbolizes the synthesized image. Further, when there are a plurality of synthesized images, substitute images of the respective synthesized images are formed such that they are made different from each other, whereby an arbitrary one of the synthesized images can be checked as to whether it is a desired image, by viewing the substitute image thereof. In this case, the substitute image of an arbitrary one of the synthesized images is set to one which is characteristic of the synthesized image and is not included in the image elements of the other synthesized images, whereby the substitute image can be set to a representative image which symbolizes the synthesized image.

Further, when the synthesized image is a color image, and m stored image elements thereof are images of unicolor images which are different from each other, even an output device which is capable of outputting only each separate unicolor image as a recognizable image can output any singe image element as a recognizable image. That is, even if the image to be output by the first image-outputting device is a color image comprised of a plurality of colors, by setting the substitute image to a unicolor image, it can be output to the second image-outputting device to cause the same to output the substitute image as a recognizable image, whereby it is possible to confirm that the image to be output by the first image-outputting device is a desired image, by using the second image-outputting device. In this case, so long as the second image-outputting device is capable of handling any monochrome image, even if the unicolor of each image element does not match the monochrome color, it can be output as a monochrome image, so that it is possible to reduce the manufacturing costs since the second image-outputting device does not need to handle the color images. Further, the second image-outputting device may be one which is capable of handling an image having only two gradation values which indicate validity and invalidity of each pixel.

Further, if the synthesized image is a monochrome image having multiple gradation values, and m stored image elements of the synthesized image are monochrome images each having a smaller number or limited range of gradation values the range of which is different from that of gradation values of any other stored image elements, even an output device which is capable of outputting only monochrome images having a smaller number or limited range of gradation values can be used to output each of the image elements separately such that it is recognizable. That is, even when an image to be output by the second image-outputting device is a monochrome image having multiple gradation values, by forming a substitute image thereof as a monochrome image having a smaller number or limited range of gradation values, the substitute image can be output to the second image-outputting device to cause the same to output the substitute image as a recognizable image. This permits the user to confirm that the image to be output by the first image-outputting device is a desired one. In this case as well, the second image-outputting device may be one which is capable of handling an image of only two gradation values which indicate validity and invalidity of each pixel, and since it is not required to handle multiple gradation values, the manufacturing costs of the apparatus can be reduced.

Furthermore, as in the cases of the examples of FIGS. 22, 26, etc., if the second image-outputting device is display means for displaying a substitute image on the display screen, it is possible to easily confirm that the image to be output by the first image-outputting device is a desired image. It should be noted that when an image having two gradation values indicative of validity and invalidity of each pixel is handled, as described above, determination as to the validity of each pixel can be carried out by using only two gradation values, this embodiment is suitable for cases when the whole image is displayed in a reduced layout or when the display screen is small. Further, similarly, when the first image-outputting device is printing means for printing an output image on a printing object material, the output image is a print image to be printed on the printing object material. Therefore, the present embodiment can be applied to a tape printing apparatus as described herein, and particularly when the output image is printed by an ink jet printing method, it can be applied to a printing apparatus based on the ink jet printing method.

Moreover, also in the second embodiment, although the printing means in the apparatus 1 is defined as the first image-outputting device, and the display means as the second image-outputting device, these output device may be formed by any other device or means which is capable of outputting an image. Further, the first and second image-outputting devices are not required to be provided in an identical image processing device. More specifically, so long as whether an output image to be output by the first image-outputting device for outputting a synthesized image formed by synthesizing a plurality of image elements as a recognizable image is a desired output image can be checked by using the second image-outputting device capable of outputting each image element as a recognizable image only when it is output separately, these image-outputting devices may be formed by any devices, such as a printing apparatus and a display device, both of which are of a general type. Further, the invention can be applied to image processing for forming images for any possible purposes.

Although in the above embodiments of the present invention, a printing apparatus of an ink jet type is employed by way of example, this is not limitative, but the invention is applicable to a thermal type, a laser type and the like.

It is further understood by those skilled in the art that the foregoing are preferred embodiments of the invention, and that various changes and modifications may be made without departing from the spirit and scope thereof.

What is claimed is:

1. A method of processing an image to be processed by an image processing device having a first image-outputting device that is capable of outputting synthesized images such that said synthesized images are recognizable, each of said synthesized images being synthesized from image elements, and a second image-outputting device that is capable of outputting any of said image elements such that said any of said image elements is recognizable only when said second image-outputting device outputs said any of said image elements separately, the method comprising the steps of:
storing said image elements of said each of said synthesized images, in a non-synthesized state, with a predetermined one of said image elements being set to a representative image element that symbolizes a corresponding one of said synthesized images; and
causing said second image-outputting device to output, in place of any one of said synthesized images, said representative image corresponding to said any one of said synthesized images.

2. A method according to claim 1, including the step of selecting one of said synthesized images, and
wherein the step of causing said second image-outputting device to output said representative image includes causing said second image-outputting device to output said representative image corresponding to said selected one of said synthesized images in place of said selected one of said synthesized images.

3. A method according to claim 1, wherein the step of storing said image elements includes storing said representative image at a head of a sequence of said image elements.

4. A method according to claim 1, wherein said representative image shows a general view of said corresponding one of said synthesized images.

5. A method according to claim 1, wherein said representative image is different from other representative images respectively corresponding to other ones of said synthesized images.

6. A method according to claim 5, wherein said representative image is characteristic of said corresponding one of said synthesized images and not included in any of other ones of said synthesized images.

7. A method according to claim 1, wherein said each of said synthesized images is a color image, and said images elements of said each of said synthesized images are images having respective unicolors different from each other.

8. A method according to claim 1, wherein said each of said synthesized images is a monochrome image having multiple gradation values, and said images elements of said each of said synthesized images are monochrome images having respective different sets of a smaller number of gradation values than the number of said multiple gradation values.

9. A method according to claim 1, wherein said second image-outputting device comprises at least one of a display device that outputs an image as a display image displayed on a display screen, and a printing device that outputs an image as a print image printed on a printing object material.

10. A method according to claim 1, where in said first image-outputting device comprises a printing device that outputs an image as a print image printed on a printing object material.

11. A method according to claim 10, wherein said printing object material is a tape.

12. A method according to claim 10, wherein said image output from said printing device is printed by an ink jet printing method.

13. An image processing device, comprising:
a first image-outputting device that is capable of outputting synthesized images such that said synthesized images are recognizable, each of said synthesized images being synthesized from image elements;
a second image-outputting device that is capable of outputting any of said image elements such that said any of said image elements is recognizable only when said second image-outputting device outputs said any of said image elements separately;
an image storage device that stores said image elements of said each of said synthesized images, in a non-synthesized state, with a predetermined one of said image elements being set to a representative image element that symbolizes a corresponding one of said synthesized images; and
an image output control section that causes said second image-outputting device to output, in place of any one of said synthesized images, said representative image corresponding to said any one of said synthesized images.

14. An image processing device according to claim 13, including a synthesized image-selecting section that selects one of said synthesized images, and
wherein said image output control section includes a selected image output control section that causes said second image-outputting device to output said representative image corresponding to said selected one of said synthesized images in place of said selected one of said synthesized images.

15. An image processing device according to claim 13, said image storage device stores said representative image at a head of a sequence of said image elements.

16. An image processing device according to claim 13, wherein said representative image shows a general view of said corresponding one of said synthesized images.

17. An image processing device according to claim 13, wherein said representative image is different from other representative images respectively corresponding to other ones of said synthesized images.

18. An image processing device according to claim 17, wherein said representative image is characteristic of said corresponding one of said synthesized images and not included in any of other ones of said synthesized images.

19. An image processing device according to claim 13, wherein said each of said synthesized images is a color image, and said images elements of said each of said synthesized images are images having respective unicolors different from each other.

20. An image processing device according to claim 13, wherein said each of said synthesized images is a monochrome image having multiple gradation values, and said images elements of said each of said synthesized images are monochrome images having respective different sets of a smaller number of gradation values than the number of said multiple gradation values.

21. An image processing device according to claim 13, wherein said second image-outputting device comprises at least one of a display device that outputs an image as a display image displayed on a display screen, and a printing device that outputs an image as a print image printed on a printing object material.

22. An image processing device according to claim 13, wherein said first image-outputting device comprises a printing device that outputs an image as a print image printed on a printing object material.

23. An image processing device according to claim 22, wherein said printing object material is a tape.

24. An image processing device according to claim 22, wherein said image output from said printing device is printed by an ink jet printing method.

25. A method of processing an image to be processed by an image processing device having a first image-outputting device that is capable of outputting synthesized images such that said synthesized images are recognizable, each of said synthesized images being synthesized from image elements, and a second image-outputting device that is capable of outputting any of said image elements such that said any of said image elements is recognizable only when said second image-outputting device outputs said any of said image elements separately,
the method comprising the steps of:
storing a substitute image equivalent to each of said image elements, said second image-outputting device being capable of outputting said substitute image such that said substitute image is recognizable, and m−1 image elements of n said image elements (n is an integer equal to or larger than 2, and m is an integer defined as $2 \leq m \leq n$), as m stored image elements corresponding to said each of said synthesized images; and
causing said second image-outputting device to output, in place of any one of said synthesized images, said substitute image corresponding to said any one of said synthesized images.

26. A method according to claim 25, including the step of selecting one of said synthesized images; and
wherein the step of causing said second image-outputting device to output said substitute image includes causing said second image-outputting device to output said substitute image corresponding to said selected one of said synthesized images, in place of said selected one of said synthesized images.

27. A method according to claim 25, wherein said n image elements include a representative image which symbolizes a corresponding of said synthesized images, and wherein said substitute image is identical to said representative image.

28. A method according to claim 25, wherein said substitute image is an image which permits remaining n−m+1 of said image elements to be generated by execution of logical operations between said image and at least one of said m−1 image elements stored as respective ones of said stored image elements.

29. A method according to claim 25, wherein the step of storing said m stored image elements includes storing said substitute image at a head of a sequence of said stored image elements.

30. A method according to claim 25, wherein said substitute image shows a general view of a corresponding one of said synthesized images.

31. A method according to claim 25, wherein said substitute image corresponding to an arbitrary one of said synthesized images is different from other substitutes images respectively corresponding to other ones of said synthesized images.

32. A method according to claim 31, wherein said substitute image corresponding to said arbitrary one of said synthesized images is an image element which is characteristic of said arbitrary one of said synthesized images and not included in said stored image elements of other ones of said synthesized images.

33. A method according to claim 25, wherein said each of said synthesized images is a color image, and said m stored images elements of said each of said synthesized images are images having respective unicolors different from each other.

34. A method according to claim 25, wherein said each of said synthesized images is a monochrome image having multiple gradation values, and said images elements of said each of said synthesized images are monochrome images having respective different sets of a smaller number of gradation values than the number of said multiple gradation values.

35. A method according to claim 25, wherein said second image-outputting device comprises a display device that outputs an image as a display image displayed on a display screen.

36. A method according to claim 25, wherein said first image-outputting device comprises a printing device that outputs an image as a print image printed on a printing object material.

37. A method according to claim 36, wherein said printing object material is a tape.

38. A method according to claim 36, wherein said image output from said printing device is printed by an ink jet printing method.

39. An image processing device, comprising:
   a first image-outputting device that is capable of outputting synthesized images such that said synthesized images are recognizable, each of said synthesized images being synthesized from n image elements (n is an integer equal to or lager than 2);
   a second image-outputting device that is capable of outputting any of said n image elements such that said any of said n image elements is recognizable only when said second image-outputting device outputs said any of said n image elements separately;
   an image storage device that stores a substitute image equivalent to each of said image elements, said second image-outputting device being capable of outputting said substitute image such that said substitute image is recognizable, and m−1 image elements of n said image elements (n is an integer equal to or larger than 2, and m is an integer defined as 2≦m≦n), as m stored image elements corresponding to said each of said synthesized images; and
   an image output control section that causing said second image-outputting device to output, in place of any one of said synthesized images, said substitute image corresponding to said any one of said synthesized images.

40. An image processing device according to claim 39, including a synthesized image-selecting section that selects one of said synthesized images, and
   wherein said image output control section includes a selected image output control section that causes said second image-outputting device to output said substitute image corresponding to said selected one of said synthesized images, in place of said selected one of said synthesized images.

41. An image processing device according to claim 39, wherein said n image elements include a representative image which symbolizes a corresponding of said synthesized images, and wherein said substitute image is identical to said representative image.

42. An image processing device according to claim 39, wherein said substitute image is an image which permits remaining n−m+1 of said image elements to be generated by execution of logical operations between said image and at least one of said m−1 image elements stored as respective ones of said stored image elements.

43. An image processing device according to claim 39, wherein said image storage device stores said substitute image at a head of a sequence of said stored image elements.

44. An image processing device according to claim 39, wherein said substitute image shows a general view of a corresponding one of said synthesized images.

45. An image processing device according to claim 39, wherein said substitute image corresponding to an arbitrary one of said synthesized images is different from other substitutes images respectively corresponding to other ones of said synthesized images.

46. An image processing device according to claim 45, wherein said substitute image corresponding to said arbitrary one of said synthesized images is characteristic of said arbitrary one of said synthesized images and not included in said stored image elements of other ones of said synthesized images.

47. An image processing device according to claim 39, wherein said each of said synthesized images is a color image, and said m stored images elements of said each of said synthesized images are images having respective unicolors different from each other.

48. An image processing device according to claim 39, wherein said each of said synthesized images is a monochrome image having multiple gradation values, and said images elements of said each of said synthesized images are monochrome images having respective different sets of a smaller number of gradation values than the number of said multiple gradation values.

49. An image processing device according to claim 39, wherein said second image-outputting device comprises a display device that outputs an image as a display image displayed on a display screen.

50. An image processing device according to claim 39, wherein said first image-outputting device comprises a printing device that outputs an image as a print image printed on a printing object material.

51. An image processing device according to claim 50, wherein said printing object material is a tape.

52. An image processing device according to claim 50, wherein said image output from said printing device is printed by an ink jet printing method.

* * * * *